US010895502B2

(12) United States Patent
Kanai et al.

(10) Patent No.: US 10,895,502 B2
(45) Date of Patent: Jan. 19, 2021

(54) MEDIA TYPE DETERMINATION DEVICE, ELECTRONIC APPARATUS, AND MEDIA TYPE DETERMINATION METHOD

(71) Applicant: Seiko Epson Corporation, Tokyo (JP)

(72) Inventors: Masashi Kanai, Azumino (JP); Eiji Osawa, Chino (JP); Ryoki Watanabe, Matsumoto (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/774,020

(22) Filed: Jan. 28, 2020

(65) Prior Publication Data

US 2020/0240843 A1    Jul. 30, 2020

(30) Foreign Application Priority Data

Jan. 29, 2019 (JP) ................................ 2019-012925

(51) Int. Cl.
*G01N 21/00* (2006.01)
*G01J 3/28* (2006.01)
*G01B 17/02* (2006.01)
*B41J 29/38* (2006.01)
*G01J 3/50* (2006.01)

(52) U.S. Cl.
CPC ................. *G01J 3/28* (2013.01); *B41J 29/38* (2013.01); *G01B 17/02* (2013.01); *G01J 3/50* (2013.01); *G01J 2003/283* (2013.01)

(58) Field of Classification Search
CPC ........ G01J 3/28; G01J 3/50; G01J 2003/0035; G01B 17/02; B41J 29/38; B41J 11/0035; B41J 11/009; G01N 21/00
See application file for complete search history.

(56) References Cited

U.S. PATENT DOCUMENTS

| 2013/0127946 A1 | 5/2013 | Kanai |
| 2014/0241114 A1 | 8/2014 | Matsuda et al. |
| 2017/0065180 A1* | 3/2017 | Miyasato ............. A61B 5/0035 |

FOREIGN PATENT DOCUMENTS

| JP | 2013-107269 A | 6/2013 |
| JP | 2014-161709 A | 9/2014 |

* cited by examiner

*Primary Examiner* — Abdullahi Nur
(74) *Attorney, Agent, or Firm* — Harness, Dickey & Pierce, P.L.C.

(57) ABSTRACT

A media type determination device includes: a light detector that detects light from a target object; a sensor that transmits an ultrasonic wave to the target object and performs an ultrasonic measurement for receiving the ultrasonic wave transmitted through the target object; and one or a plurality of processors. The one or plurality of processors are programmed to execute a method including: acquiring light information corresponding to the light from the target object, from the light detector; acquiring ultrasonic wave information corresponding to an ultrasonic wave via the target object from the sensor, and determining a type of target object based on the light information and the ultrasonic wave information.

10 Claims, 13 Drawing Sheets

MEDIA TYPE DETERMINATION DEVICE, ELECTRONIC APPARATUS, AND MEDIA TYPE DETERMINATION METHOD

The present application is based on, and claims priority from, JP Application Serial Number 2019-012925, filed Jan. 29, 2019, the disclosure of which is hereby incorporated by reference herein in its entirety.

BACKGROUND

1. Technical Field

The present disclosure relates to a media type determination device, an electronic apparatus, and a media type determination method.

2. Related Art

In the related art, an electronic apparatus such as a printing apparatus or an image scanner that determines a type of a medium such as paper and performs print processing or image capture processing, is known (refer to, for example, JP-A-2013-107269). In the printing apparatus disclosed in JP-A-2013-107269, an average spectrum intensity of a plurality of reference print media and a covariance matrix indicating a relationship between values measured in different measurement wavelengths are stored in advance in a storage unit. Then, when performing printing on the print media, a spectroscopic measurement is performed on the print medium, Mahalanobis distances between the measured spectrum intensity and a plurality of reference print media is calculated, and then, the type of the print medium is determined based on the Mahalanobis distance.

However, in the media type determination based on the spectrum intensity of a target object such as a print medium, the media type determination can be performed based on composition substances contained in the target object and a composition ratio, but it is difficult to determine the type due to the differences of the media in thickness. By detecting light transmitted through the target object, or the like, it may be conceivable to indirectly measure the thickness based on the light transmittance, or the like, however, since it is limited to only the light transmissive target object, the media type determination based on the thickness of the target object cannot be performed with sufficient accuracy.

SUMMARY

A media type determination device according to a first application example includes: a light detector that detects light from a target object; a sensor that transmits an ultrasonic wave to the target object and performs an ultrasonic measurement for receiving the ultrasonic wave transmitted through the target object; and one or a plurality of processors. The one or plurality of processors are programmed to execute a method including: acquiring light information corresponding to the light from the target object, from the light detector; acquiring ultrasonic wave information corresponding to an ultrasonic wave via the target object from the sensor; and determining a type of target object based on the light information and the ultrasonic wave information.

In the media type determination device according to the first application example, the light detector may perform a spectroscopic measurement on the target object. The one or plurality of processors may be programmed to execute the method including: acquiring spectral information corresponding to a plurality of spectral wavelengths included in the light from the target object, from a spectrometer as the light information.

In the media type determination device according to the first application example, the one or plurality of processors may be programmed to execute a method including: calculating an average of feature amounts indicating features of reference targets and a covariance matrix of the feature amounts for each of a plurality of types of the reference targets based on the spectral information and the ultrasonic wave information obtained by performing the spectroscopic measurement multiple times for the reference targets by the light detector and performing the ultrasonic measurement by the sensor; and calculating a Mahalanobis distance between the target object and the reference target by using the calculated average and covariance matrix. The one or plurality of processors may be further programmed to execute the method including: determining the type of the target object based on the Mahalanobis distance for the plurality of types of the reference targets.

In the media type determination device according to the first application example, the sensor may include an ultrasonic wave transmission device that transmits an ultrasonic wave to the target object, and an ultrasonic wave reception device that is arranged on a side opposite to the ultrasonic wave transmission device with respect to the target object and receives the ultrasonic wave transmitted through the target object. The one or plurality of the processors may be programmed to execute acquire a received sound pressure of the ultrasonic wave when the ultrasonic wave transmitted through the target object is received by the ultrasonic wave reception device as the ultrasonic wave information.

In the media type determination device according to the first application example, the one or plurality of processors may be programmed to execute the method including: measuring a thickness of the target object based on the determined type of the target object and the received sound pressure.

In the media type determination device according to the first application example, the sensor may perform the ultrasonic measurement with the ultrasonic wave of a plurality of frequencies. The one or plurality of processors may be programmed to execute the method including: measuring the thickness of the target object based on the received sound pressure of each ultrasonic wave of each frequency.

In the media type determination device according to the first application example, the ultrasonic wave transmission device may transmit an ultrasonic wave to the target object from a plurality of angles. The one or plurality of processors may be programmed to execute the method including: measuring the thickness of the target object based on the angle corresponding to a maximum received sound pressure among the received sound pressures of the ultrasonic waves corresponding to the respective angle.

The media type determination device according to the first application example may further include a transmitter element that transmits an ultrasonic wave to the target object, a receiver element that is arranged on a side opposite to the transmitter element with respect to the target object and receives the ultrasonic wave transmitted through the target object, and a duplicate detection sensor that measures a second received sound pressure which is the received sound pressure when the ultrasonic wave transmitted through the target object is received by the receiver element. The one or plurality of processors are programmed to execute the method including: determining a duplicate of the target objects by comparing the second received sound pressure and a predetermined threshold value, and setting the threshold value according to the determined type and the measured thickness of the target object.

An electronic apparatus according to a second application example includes: the media type determination device according to the first application example, and a processing portion that performs predetermined processing based on the type of the target object determined by the one or plurality of processors.

A media type determination method according to a third application example is a method for determining a type of a target object. The method includes: detecting light from the target objects using a light detector; transmitting an ultrasonic wave to the target object and perform an ultrasonic measurement to receive the ultrasonic wave transmitted through the target objects using a sensor; acquiring light information corresponding to the light from the target object, from the light detector; acquiring ultrasonic wave information corresponding to the ultrasonic wave transmitted through the target object, from the sensor; and determining a type of the target object based on the light information and the ultrasonic wave information.

DESCRIPTION OF EXEMPLARY EMBODIMENTS

First Embodiment

Hereinafter, a first embodiment will be described.

Figure 1:
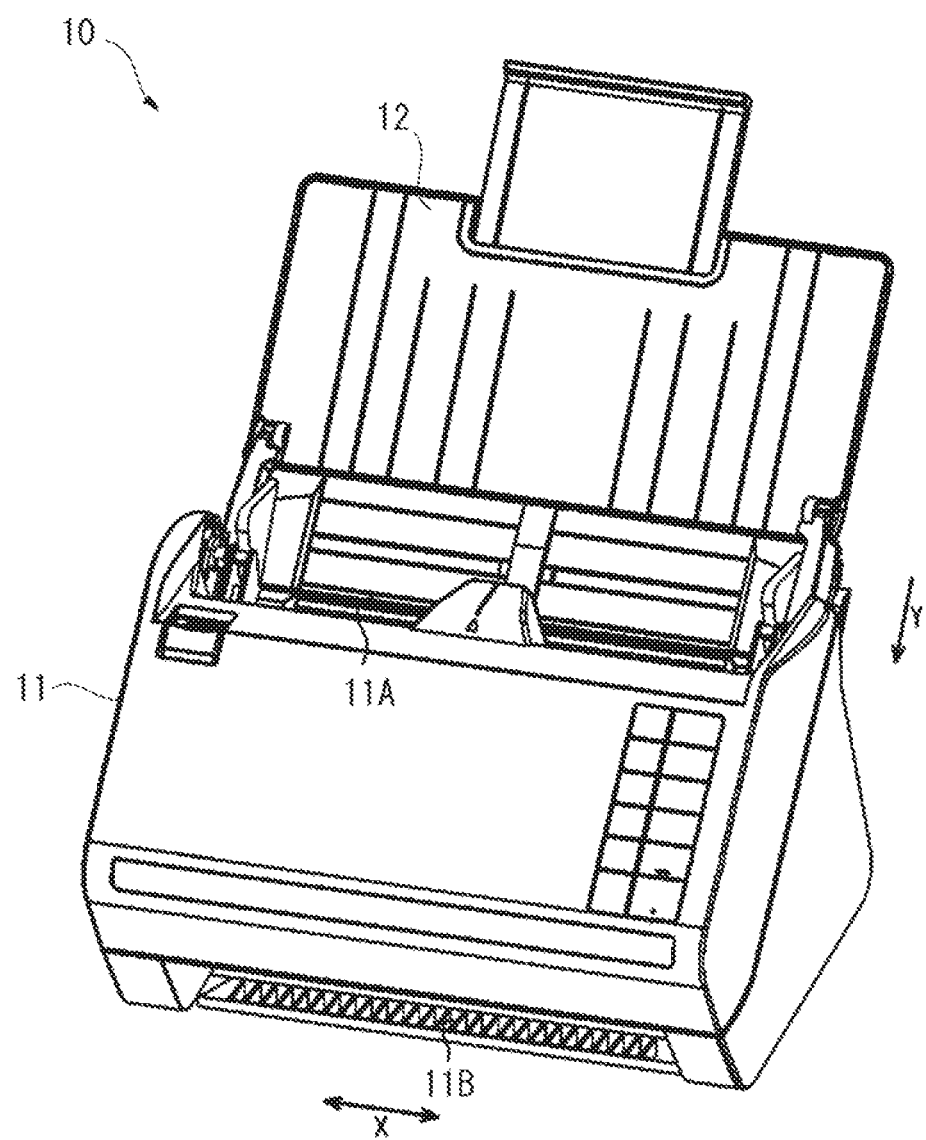
FIG. 1 is an external view illustrating a schematic configuration of an image scanner in a first embodiment.
Figure 2:
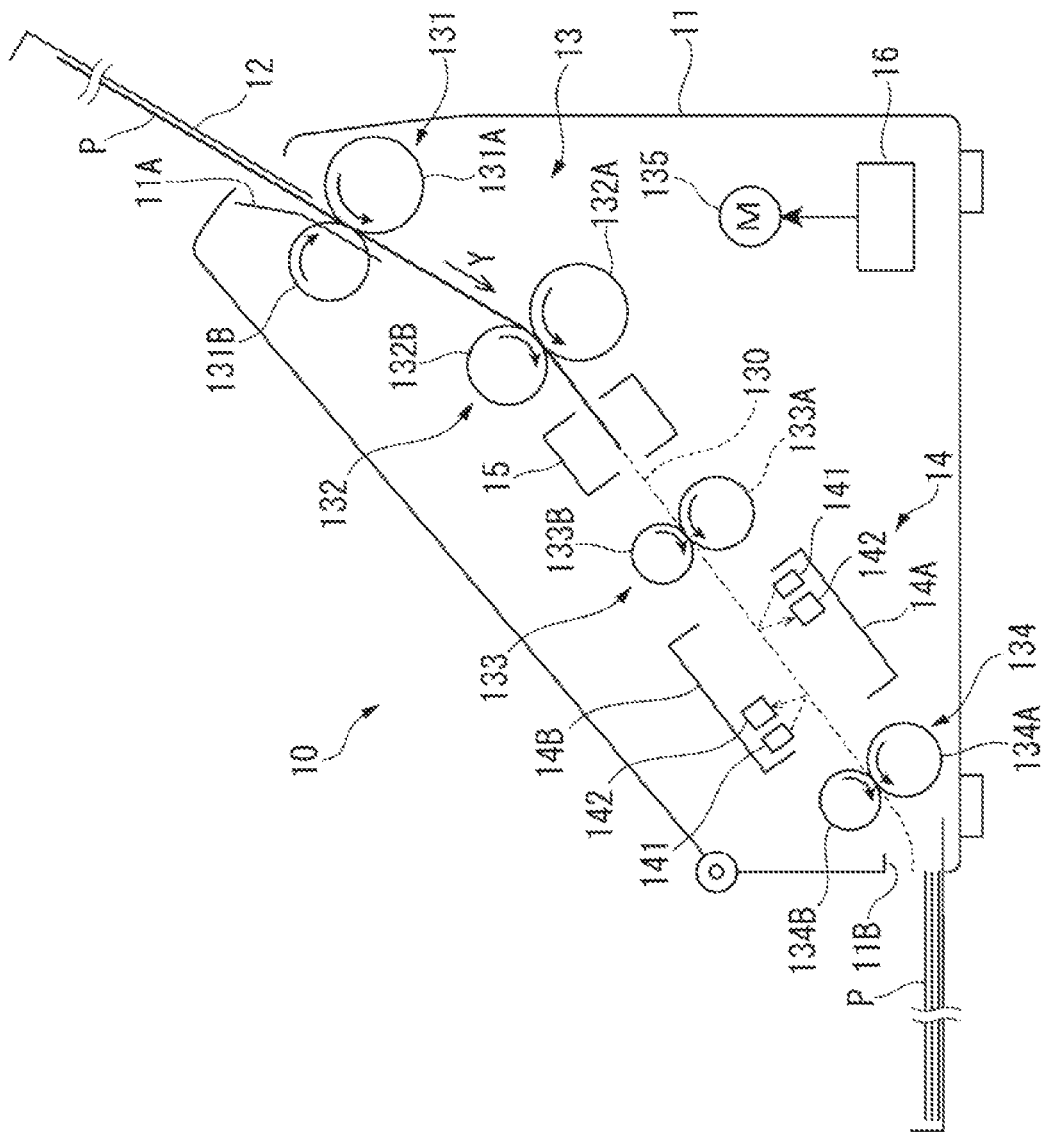
FIG. 2 is a side sectional view illustrating an outline of a transport portion of the image scanner in the first embodiment.

FIG. 1 is an external view illustrating a schematic configuration of an image scanner 10 in the present embodiment. FIG. 2 is a side sectional view illustrating an outline of a transport portion of the image scanner 10. FIG. 2 is a side sectional view of the image scanner 10 viewed from a main scanning direction (X direction) orthogonal to a transport direction (Y direction).

Configuration of Image Scanner 10

The image scanner 10 is an example of an electronic apparatus, and the image scanner 10 includes an apparatus main body 11 and a media support 12 as illustrated in FIG. 1. As illustrated in FIG. 2, a transport portion that transports media P that is a target object, a scanning portion 14 that reads an image of the transported media P, a sensor portion 15, and a controller 16 for controlling the image scanner 10 are provided in the apparatus main body 11.

For example, a flexible thin plate such as paper, a film, and fabric can be used as the media P.

As illustrated in FIG. 1 and FIG. 2, a feeding port 11A is provided in the apparatus main body 11 at a connection position with the media support 12. The media P placed on the media support 12 is fed to the feeding port 11A one by one. The fed media P is transported by the transport portion 13 along a predetermined transport path 130 in the apparatus main body 11. The image is read by the scanning portion 14 at a reading position during the transport, and then, the media is discharged from a discharge port 11B opened to a lower front side of the apparatus main body 11.

Configuration of Transport Portion 13

The transport portion 13 transports a plurality of media P set in the media support 12 one by one in the transport direction (Y direction). That is, the transport portion 13 feeds the media P sent from the feeding port 11A while guiding into the apparatus main body 11, and transports the fed media P along a predetermined transport path 130.

Specifically, the transport portion 13 includes a pair of first feeding rollers 131 arranged upstream in the Y direction (negative Y side) of the transport path 130, and a pair of second feeding rollers 132 arranged downstream in the Y direction (positive Y side) of the pair of the first feeding rollers 131. Furthermore, the transport portion 13 includes a pair of first transport rollers 133 arranged on the negative Y side across the reading position of the media P, and a pair of second transport rollers 134 arranged on the positive Y side.

The pair of first feeding rollers 131 are configured to include a first drive roller 131A and a first driven roller 131B. Similarly, the pair of second feeding rollers 132 are configured to include a second drive roller 132A and a second driven roller 132B. In addition, the pair of first transport rollers 133 are configured to include a third drive roller 133A and a third driven roller 133B. Similarly, the pair of second transport rollers 134 are configured to include a fourth drive roller 134A and a fourth driven roller 134B. Each driven roller 131B to 134B is driven (passively rotated) by the rotation of the pair of drive rollers 131A to 134A.

The drive rollers 131A to 134A configuring the pairs of rollers 131 to 134 are rotationally driven by a power of a transport motor 135 that is a power source thereof. The transport motor 135 is controlled by the controller 16 and drives the drive rollers 131A to 134A.

In addition, the second driven roller 132B configuring the pair of second feeding rollers 132 is a retard roller, a friction coefficient of the outer peripheral surface thereof to the media P is larger than the friction coefficient of the outer peripheral surface of the second drive roller 132A to the media P. Therefore, the pair of second feeding rollers 132 functions as a separation mechanism that separates the media P one by one and feeds them to the positive Y side. Therefore, the plurality of media P loaded on the media support 12 are fed into the apparatus main body 11 by the rotation of the pair of first feeding rollers 131 from the feeding port 11A one by one in an order from the highest one, for example, and are separated one by one and fed to the positive Y side by the rotation of the pair of second feeding rollers 132.

Configuration of Scanning Portion 14

As illustrated in FIG. 2, a reading position for reading the image on the media P is provided between the pair of first transport rollers 133 and the pair of second transport rollers 134 in the transport path 130, and the scanning portion 14 is provided.

The scanning portion 14 corresponds to a processing portion in the electronic apparatus, and includes a first scanning portion 14A and a second scanning portion 14B provided on both sides of the transport path 130. The scanning portion 14 is configured to include a light source 141 capable of irradiating the media P with light during the transport and an image sensor 142 extending in the main scanning direction (X direction). In a normal reading mode for reading the surface of media P, the first scanning portion 14A performs the reading operation, and in a double-side reading mode for reading the front and back surfaces of media P, both the first scanning portion 14A and the second scanning portion 14B perform the reading operation. The light source 141 and the image sensor 142 configuring the first scanning portion 14A and the second scanning portion 14B are coupled to the controller 16, and scanning processing for reading the image on the media P is performed under the control of the controller 16.

Configuration of Sensor Portion 15

Figure 3:
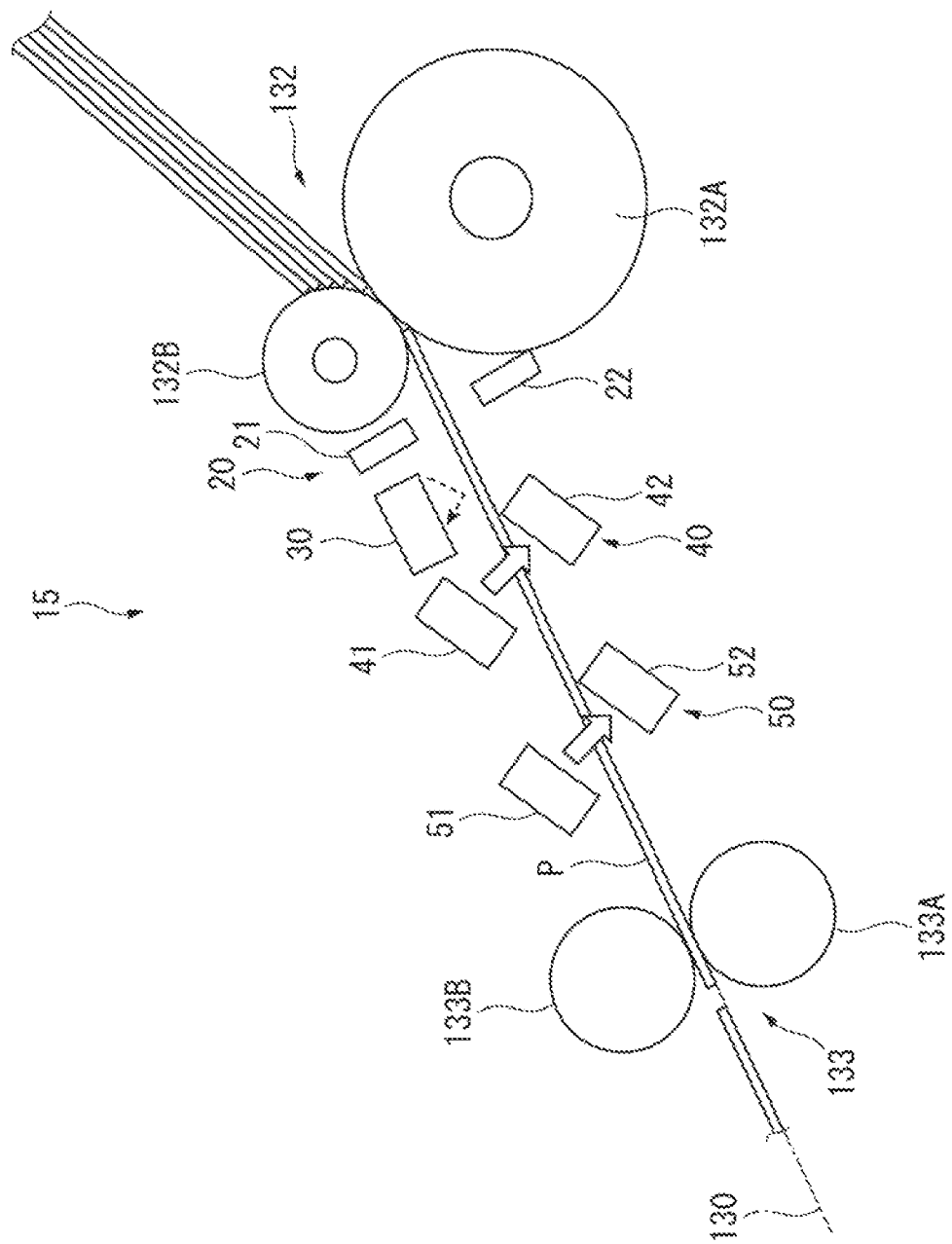
FIG. 3 is a side view illustrating a schematic configuration of a sensor portion in the first embodiment.

FIG. 3 is a side view illustrating a schematic configuration of the sensor portion 15.

As illustrated in FIG. 3, the sensor portion 15 is provided at a position between the pair of second feeding rollers 132 and the pair of first transport rollers 133 in the transport path 130. The sensor portion 15 is provided with sensors for determining the type of media P and for detecting duplication of media P, and a media type determination device is configured to include the sensor portion 15 and the controller 16.

Specifically, as illustrated in FIG. 3, the sensor portion 15 is provided with a transport detection sensor 20, a spectrometer 30, a thickness measurement sensor 40, and a duplicate detection sensor 50.

Configuration of Transport Detection Sensor 20

The transport detection sensor 20 is configured to include, for example, a light emission portion 21 and a light receiving portion 22 that are arranged across the transport path 130. The transport detection sensor 20 detects the presence or absence of the media P on the transport path 130 by outputting light from the light emission portion 21 and receiving the light at the light receiving portion 22.

In FIG. 3, the position where the transport detection sensor 20 is provided is illustrated as the most upstream position in the transport direction, however, the position is not limited thereto, and for example, the position may be between the thickness measurement sensor 40 and the duplicate detection sensor 50. In addition, a plurality of transport detection sensors 20 may be provided in the sensor portions 15. In this case, for example, the transport detection sensors 20 may be provided at the position between the spectrometer 30 and the thickness measurement sensor 40, between the thickness measurement sensor 40 and the duplicate detection sensor 50, and each position at the upstream of the spectrometer 30 and downstream of the duplicate detection sensor 50.

In addition, the configuration of the transport detection sensor 20 is not limited to the configuration in which the light emission portion 21 and the light receiving portion 22 are arranged across the transport path 130. For example, the light emitted from the light emission portion 21 and the light reflected by the media P may be received by the light receiving portion 22. In this case, when the media P is transported, the light receiving portion 22 detects light. Furthermore, the detection of transport of the media P is not limited to that based on the light, but for example, an ultrasonic wave may be used instead of the light. Alternatively, a contact type sensor may be used, which detects the transport of the media P by detecting a contact of the media P with a detection lever arranged on the transport path 130.

Configuration of Spectrometer 30

Figure 4:
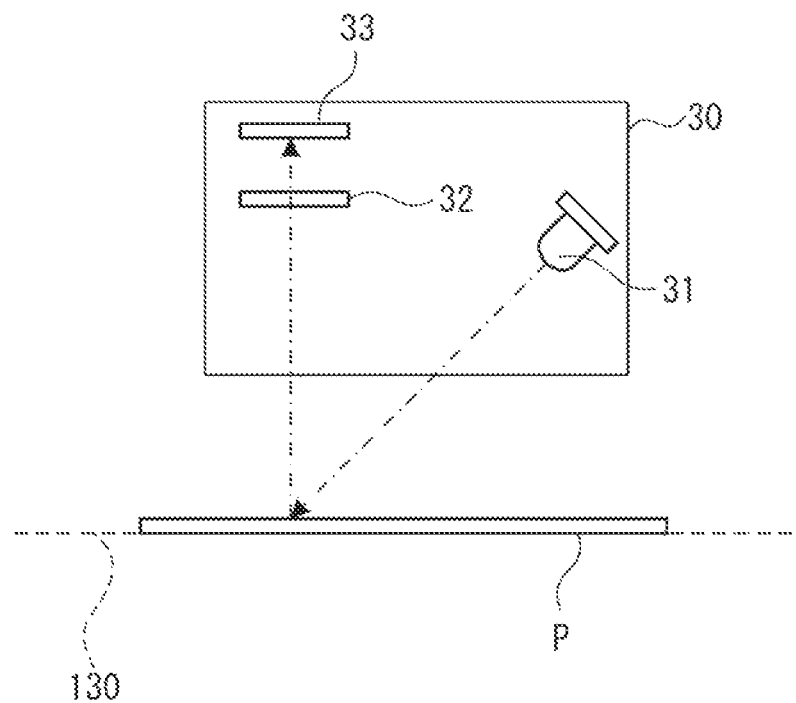
FIG. 4 is a diagram illustrating a schematic configuration of a spectrometer in the first embodiment.

FIG. 4 is a diagram illustrating a schematic configuration of the spectrometer 30.

The spectrometer 30 is a light detector, and includes a light source portion 31, a spectroscopic element 32, and a light receiver element 33 as illustrated in FIG. 4. In the spectrometer 30, light is emitted from the light source portion 31 to the media P, and the light reflected by the media P is incident on the spectroscopic element 32. The spectroscopic element 32 is configured to transmit the light having a predetermined spectral wavelength from incident light and to change the spectral wavelength. In this way, the light receiver element 33 can acquire a spectrum intensity of the light having the spectral wavelength as optical information. Although not illustrated, the spectrometer 30 may be configured to include a band-pass filter that limits the wavelength band of the light received by the light receiver element 33, and a plurality of lenses that guide the light from the light source portion 31 to the media P, or guide the light reflected by the media P to the spectroscopic element 32 and the light receiver element 33.

The light source portion 31 includes a light source having an emission wavelength band that includes a plurality of spectral wavelengths to be spectrally separated by the spectroscopic element 32. For example, when spectroscopic element 32 separates a plurality of spectral wavelengths included in the near infrared band from the visible light band, a light source such as a halogen lamp or LED having the emission wavelength band from the visible light band to the near infrared band, is used. When detecting the presence or absence of the fluorescent component of the media P, a light source that outputs the light having the ultraviolet band may be used, or a light source may output the light having a wide wavelength band by combining a plurality of light sources.

The spectroscopic element 32 is configured with a wavelength variable filter, and for example, a Fabry-Perot etalon element can be used, in which a pair of reflective films are arranged to face each other and a distance between the pair of reflective films can be changed. In such a Fabry-Perot etalon element, the wavelength of light to be transmitted can be changed by changing the distance between the pair of reflective films.

Not limited to the Fabry-Perot etalon element as described above, a liquid crystal tunable filter, an acousto-optic tunable filter, a grating element, or the like may be used as the spectroscopic element 32.

The light receiver element 33 receives the light having the spectral wavelength transmitted through the spectroscopic element 32, and outputs a light reception signal corresponding to the spectrum intensity.

In addition, although not illustrated, the spectrometer 30 includes a light source drive circuit for driving the light source portion 31, a spectral drive circuit for driving the spectroscopic element 32, and a light receiving circuit for processing the light reception signal output from the light receiver element 33. These circuits are coupled to the controller 16, and spectroscopic measurement is performed by the spectrometer 30 under the control of the controller 16. That is, the spectrometer 30 switches the wavelength of the light to be spectrally diffracted by the spectroscopic element 32 based on a command from the controller 16. Then, the light having the switched spectral wavelength is received by the light receiver element 33, and the spectral intensities of a plurality of spectral wavelengths are acquired to be output to the controller 16.

Configuration of Thickness Measurement Sensor 40

The thickness measurement sensor 40 is provided in the vicinity of the spectrometer 30, and for example, in the present embodiment, as illustrated in FIG. 3, is provided at the downstream of the spectrometer 30 in the transport direction. The thickness measurement sensor 40 may be provided at the upstream of the spectrometer 30 in the transport direction.

Figure 5:
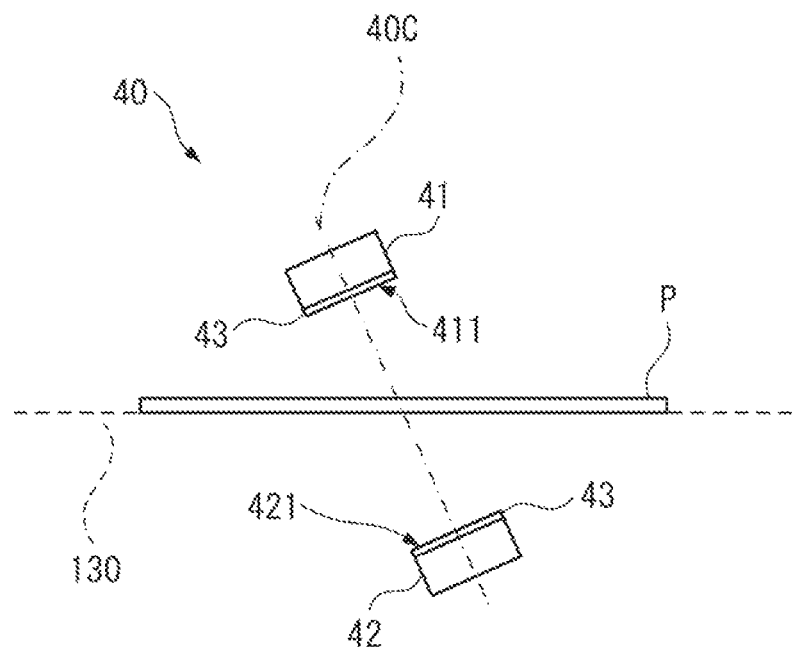
FIG. 5 is a diagram illustrating a schematic configuration of a thickness measurement sensor in the first embodiment.

FIG. 5 is a diagram illustrating a schematic configuration of the thickness measurement sensor 40.

The thickness measurement sensor 40 is an ultrasonic wave detector, and as illustrated in FIG. 3 and FIG. 5, is provided with an ultrasonic wave transmitter 41 for transmitting the ultrasonic wave and an ultrasonic wave receiver 42 for receiving the ultrasonic wave at the side opposite to the ultrasonic wave transmitter 41 with respect to the transport path 130.

As illustrated in FIG. 5, the ultrasonic wave transmitter 41 and the ultrasonic wave receiver 42 of the thickness measurement sensor 40 are arranged to face each other on the axis of a first sensor central axis 40C which is the transmission/reception axis of the ultrasonic wave, and across the transport path 130 on which the media P is transported.

In the thickness measurement sensor 40, the ultrasonic wave is transmitted to the media P transported along the transport path 130 by the transport portion 13 from the ultrasonic wave transmitter 41. The ultrasonic wave transmitted from the ultrasonic wave transmitter 41 is input to the media P, and the ultrasonic wave transmitted through the media P is received by the ultrasonic wave receiver 42. When the ultrasonic wave is received, the ultrasonic wave receiver 42 outputs a first reception signal corresponding to the received sound pressure of the ultrasonic wave that is ultrasonic wave information. Hereinafter, the received sound pressure of the ultrasonic wave received by the ultrasonic wave receiver 42 of the thickness measurement sensor 40 is referred to as a first received sound pressure, and the received sound pressure of the ultrasonic wave received by a receiver element 52 of the duplicate detection sensor 50 is a second received sound pressure.

As illustrated in FIG. 5, in the present embodiment, the first sensor central axis 40C is an axis passing through a center of a transmission surface 411 of the ultrasonic wave transmitter 41 from which the ultrasonic wave is transmitted and a center of a reception surface 421 of the ultrasonic wave receiver 42 where the ultrasonic wave is received. The first sensor central axis 40C is inclined with respect to the normal line of the transport path 130. Accordingly, the first sensor central axis 40C is also inclined with respect to the normal line of the media P transported through the transport path 130. As a result, a problem of multiple reflection of the ultrasonic wave between the media P and the ultrasonic wave transmitter 41 or between the media P and the ultrasonic wave receiver 42 on the transport path 130 can be suppressed, and thus, it is possible to suppress a noise of the first reception signal due to the multiple reflections.

The ultrasonic wave transmitter 41 and the ultrasonic wave receiver 42 include a first ultrasonic wave device 43, respectively.

Figure 6:
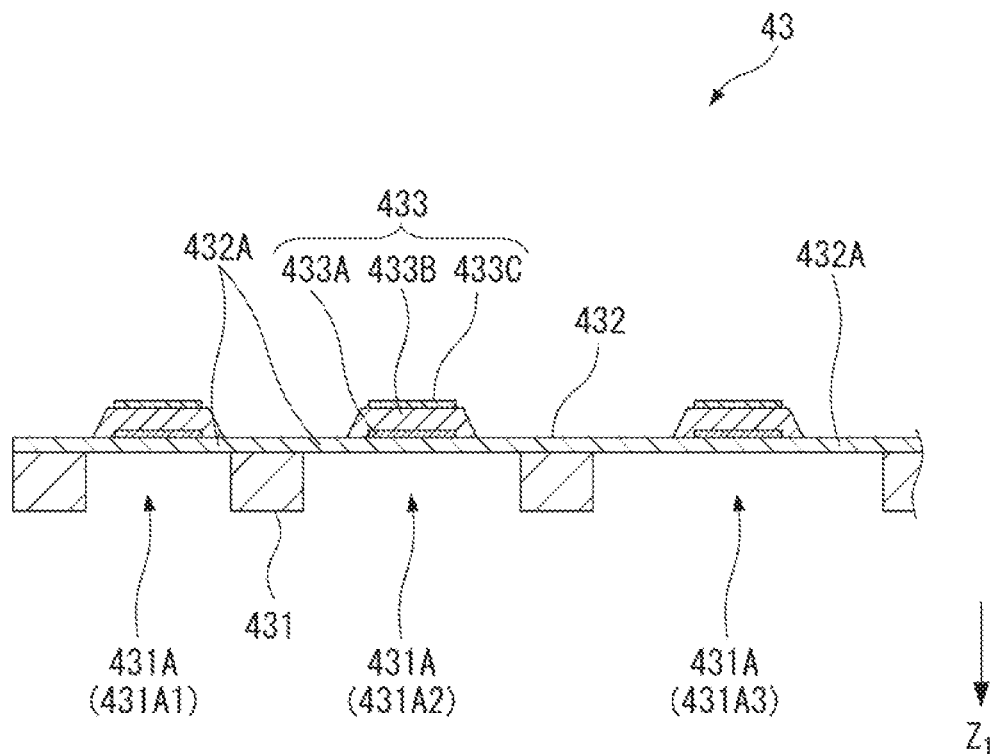
FIG. 6 is a cross-sectional view of an ultrasonic wave device of the thickness measurement sensor of the first embodiment.

FIG. 6 is a cross-sectional view of the first ultrasonic wave device 43.

As illustrated in FIG. 6, the first ultrasonic wave device 43 is configured to include a first substrate 431, a first vibrating plate 432, and a first piezoelectric element 433. In the description hereafter, the substrate thickness direction of the first substrate 431 is defined as a $Z_1$ direction. The $Z_1$ direction is a direction in which the ultrasonic wave travels and is parallel to the first sensor central axis 40C.

The first substrate 431 is a substrate that supports the first vibrating plate 432, and is a substrate composed of semiconductor such as Si. The first substrate 431 is provided with a plurality of types of openings 431A penetrating the first substrate 431 along the $Z_1$ direction and having different opening widths.

In the example illustrated in FIG. 6, three types of openings 431A1, 431A2, and 431A3 having different opening widths are illustrated, but four or more types of openings 431A having different opening widths may be provided.

The first vibrating plate 432 is composed of $SiO_2$, a laminated body of $SiO_2$ and $ZrO_2$, or the like, and is provided on the first substrate 431 at the negative side of $Z_1$. The first vibrating plate 432 is supported by the first substrate 431 configuring the opening 431A, and closes the opening 431A at the negative side of $Z_1$. Among the first vibrating plates 432, the portion overlapping each opening 431A seen from the $Z_1$ direction configures a vibrator 432A that transmits and receives an ultrasonic wave by vibration in the first vibrating plate 432.

The first piezoelectric element 433 is provided on the first vibrating plate 432 and at a position overlapping each vibrator 432A seen from the $Z_1$ direction. As illustrated in FIG. 6, the first piezoelectric element 433 is configured by laminating a lower electrode 433A, a piezoelectric film 433B, and an upper electrode 433C on the first vibrating plate 432 in this order.

In such a first ultrasonic wave device 43, one ultrasonic transducer is configured with one vibrator 432A and the first piezoelectric element 433 arranged on the vibrator 432A.

In the first ultrasonic wave device 43 of the ultrasonic wave transmitter 41, the piezoelectric film 433B expands and contracts by applying a drive voltage between the lower electrode 433A and the upper electrode 433C. As a result, the vibrator 432A vibrates at a frequency corresponding to the opening width of the opening 431A and the like, and then, an ultrasonic wave is transmitted from the vibrator 432A toward the positive side of $Z_1$ along the first sensor central axis 40C. That is, the surface on the positive side of $Z_1$ of the first substrate 431 becomes the transmission surface 411 of the ultrasonic wave of the ultrasonic wave transmitter 41, and thus, the ultrasonic wave is transmitted. In addition, as described above, since a plurality of types of openings 431A having different opening widths are provided on the first substrate 431, it is possible to transmit the ultrasonic wave having a different frequency from the ultrasonic wave transmitter 41. For example, when outputting only one type of frequency of ultrasonic wave, the drive voltage is applied to the first piezoelectric element 433 overlapping the opening 431A having an opening width corresponding to the frequency.

In addition, in the first ultrasonic wave device 43 of the ultrasonic wave receiver 42, the first vibrating plate 432 is arranged on the first substrate 431 at the positive side of $Z_1$, and the first piezoelectric element 433 is arranged on the first vibrating plate 432 at the positive side of $Z_1$. Therefore, in the first ultrasonic wave device 43 of the ultrasonic wave receiver 42, a surface of the first substrate 431 at the negative side of $Z_1$ on which the first vibrating plate 432 is not provided becomes the reception surface 421, and thus, the ultrasonic wave input toward the positive side of $Z_1$ from the negative side of $Z_1$ is received. When the ultrasonic wave is input from the opening 431A along the first sensor central axis 40C, the vibrator 432A vibrates with an amplitude corresponding to the received sound pressure of the received ultrasonic wave, and a potential difference is generated between the lower electrode 433A side and the upper electrode 433C side of the piezoelectric film 433B, and then, the first reception signal corresponding to the potential difference is output. At this time, since the vibrator 432A having a resonance frequency substantially the same as the frequency of the input ultrasonic wave resonates, the vibration amplitude increases and the larger first reception signal is output. Therefore, by coupling the ultrasonic transducers having the same opening width in series, it is possible to detect the ultrasonic wave having a frequency corresponding to the opening width with high accuracy.

In addition, although not illustrated, the thickness measurement sensor 40 includes a drive circuit that drives the ultrasonic wave transmitter 41 and a receiver circuit that processes the first reception signal output from the ultrasonic wave receiver 42, and each circuit is coupled to the controller 16.

When a command for driving the thickness measurement sensor 40 is input from the controller 16, the drive circuit controls the ultrasonic wave transmitter 41 to transmit the ultrasonic waves having a plurality of frequencies simultaneously or individually.

When the ultrasonic wave is received by the ultrasonic wave receiver 42, the first reception signal according to the first received sound pressure corresponding to each frequency is input to the receiver circuit. The receiver circuit includes an amplifier circuit, an AD conversion circuit, and the like, and outputs the first reception signal processed by these circuits to the controller 16.

Configuration of Duplication Detection Sensor 50

As illustrated in FIG. 3, the duplicate detection sensor 50 is provided at downstream of the spectrometer 30 and the thickness measurement sensor 40 in the transport direction.

Figure 7:
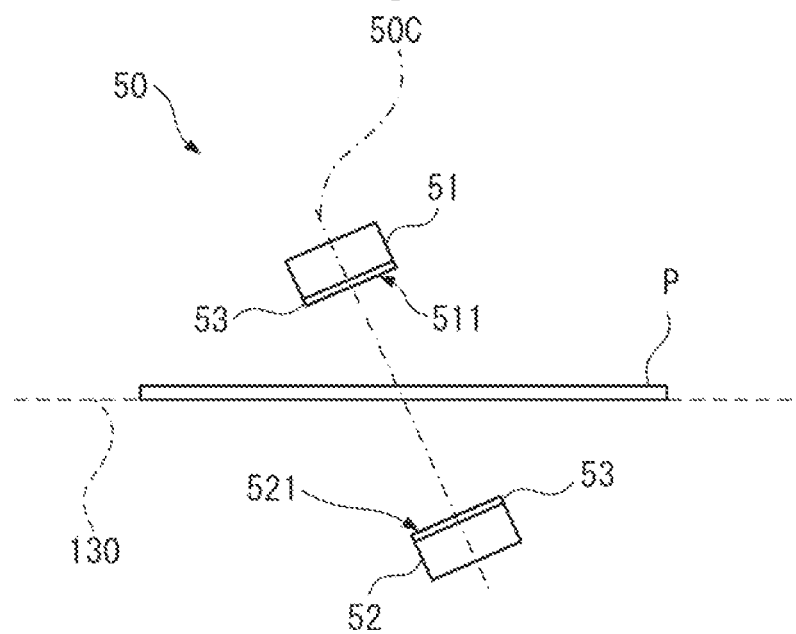
FIG. 7 is a diagram illustrating a schematic configuration of a duplicate detection sensor in the first embodiment.

FIG. 7 is a diagram illustrating a schematic configuration of the duplicate detection sensor 50.

The duplicate detection sensor 50 has a configuration substantially the same as that of the thickness measurement sensor 40. As illustrated in FIG. 3 and FIG. 7, a transmitter element 51 that transmits the ultrasonic wave and a receiver element 52 that is provided on the side opposite to the transmitter element 51 with respect to the transport path 130 and receives the ultrasonic wave are provided in the duplicate detection sensor.

As illustrated in FIG. 7, the transmitter element 51 and the receiver element 52 of the duplicate detection sensor 50 are arranged to face each other on the axis of a second sensor central axis 50C which is inclined with respect to the transport path 130, and across the transport path 130 on which the media P is transported.

In the duplicate detection sensor 50, similarly to the thickness measurement sensor 40, the ultrasonic wave is transmitted to the media P from transmitter element 51, and by receiving the ultrasonic wave transmitted through the media P by the receiver element 52, a second reception signal corresponding to the sound pressure of the received ultrasonic wave is output.

As illustrated in FIG. 7, the second sensor central axis 50C is an axis passing through a center of a second transmission surface 511 where the ultrasonic wave of the transmitter element 51 is transmitted and a center of a second reception surface 521 where the ultrasonic wave of the receiver element 52 is received. The second sensor central axis 50C is inclined with respect to the transport path 130. As a result, a problem of multiple reflection of the ultrasonic wave between the media P and the transmitter element 51 or between the media P and the receiver element 42 on the transport path 130 can be suppressed, and thus, it is possible to suppress a noise of the second reception signal due to the multiple reflection.

The transmitter element 51 and the receiver element 52 include a second ultrasonic wave device 53, respectively.

Figure 8:
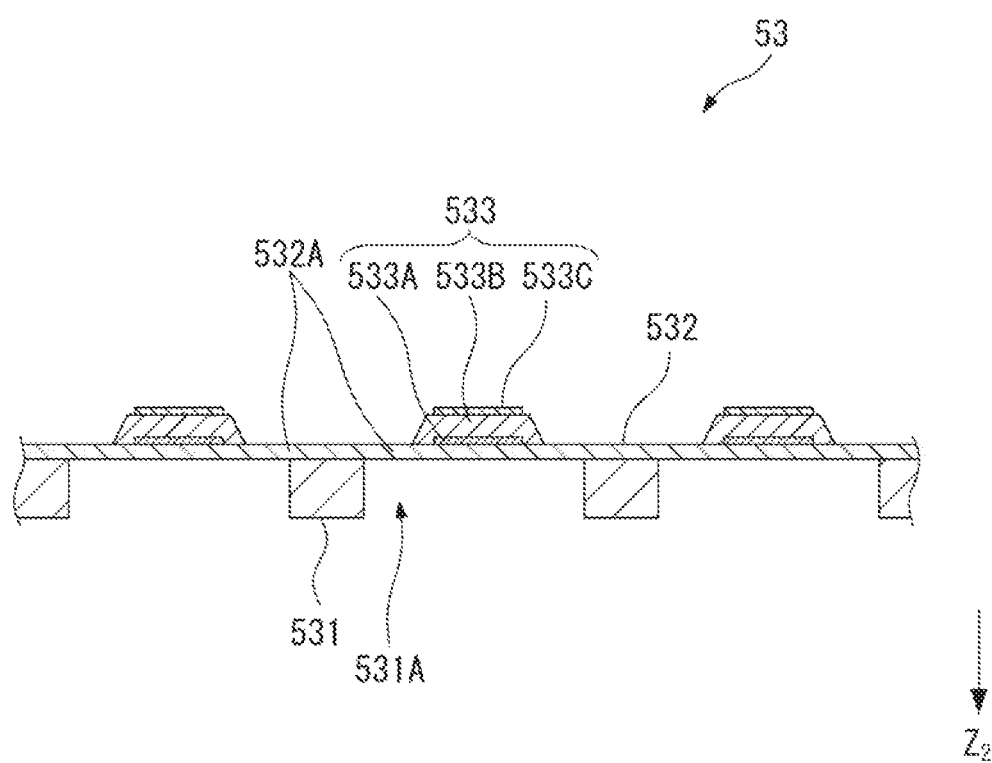
FIG. 8 is a cross-sectional view of an ultrasonic wave device of the duplicate detection sensor in the first embodiment.

FIG. 8 is a cross-sectional view of the second ultrasonic wave device 53.

As illustrated in FIG. 8, the second ultrasonic wave device 53 has a configuration substantially the same as that of the first ultrasonic wave device 43. That is, the second ultrasonic wave device 53 is configured to include a second substrate 531, a second vibrating plate 532, and a second piezoelectric element 533. In the description hereafter, the substrate thickness direction of the second substrate 531 is defined as a Z2 direction. The Z2 direction is a direction in which the ultrasonic wave travels, and is parallel to the second sensor central axis 50C.

Similarly to the first substrate 431, the second substrate 531 includes a plurality of openings 531A. Here, the first substrate 431 is provided with a plurality of types of openings 431A having different opening widths, whereas the second substrate 531 is provided with a plurality of openings 531A having the same opening width.

The second vibrating plate 532 and the second piezoelectric element 533 have the same configuration as the first vibrating plate 432 and the first piezoelectric element 433, and the description thereof will not be repeated here.

In addition, although not illustrated, the duplicate detection sensor 50 includes a drive circuit that drives the transmitter element 51 and a receiver circuit that processes the second reception signal output from the receiver element 52, and each circuit is coupled to the controller 16.

When a command for driving the duplicate detection sensor 50 is input from the controller 16 to the drive circuit, the drive circuit controls the transmitter element 51 to transmit the ultrasonic wave, and the second reception signal corresponding to the second received sound pressure of the ultrasonic wave received by the receiver element 52 is output to the controller 16 via the receiver circuit.

Configuration of Controller 16

Figure 9:
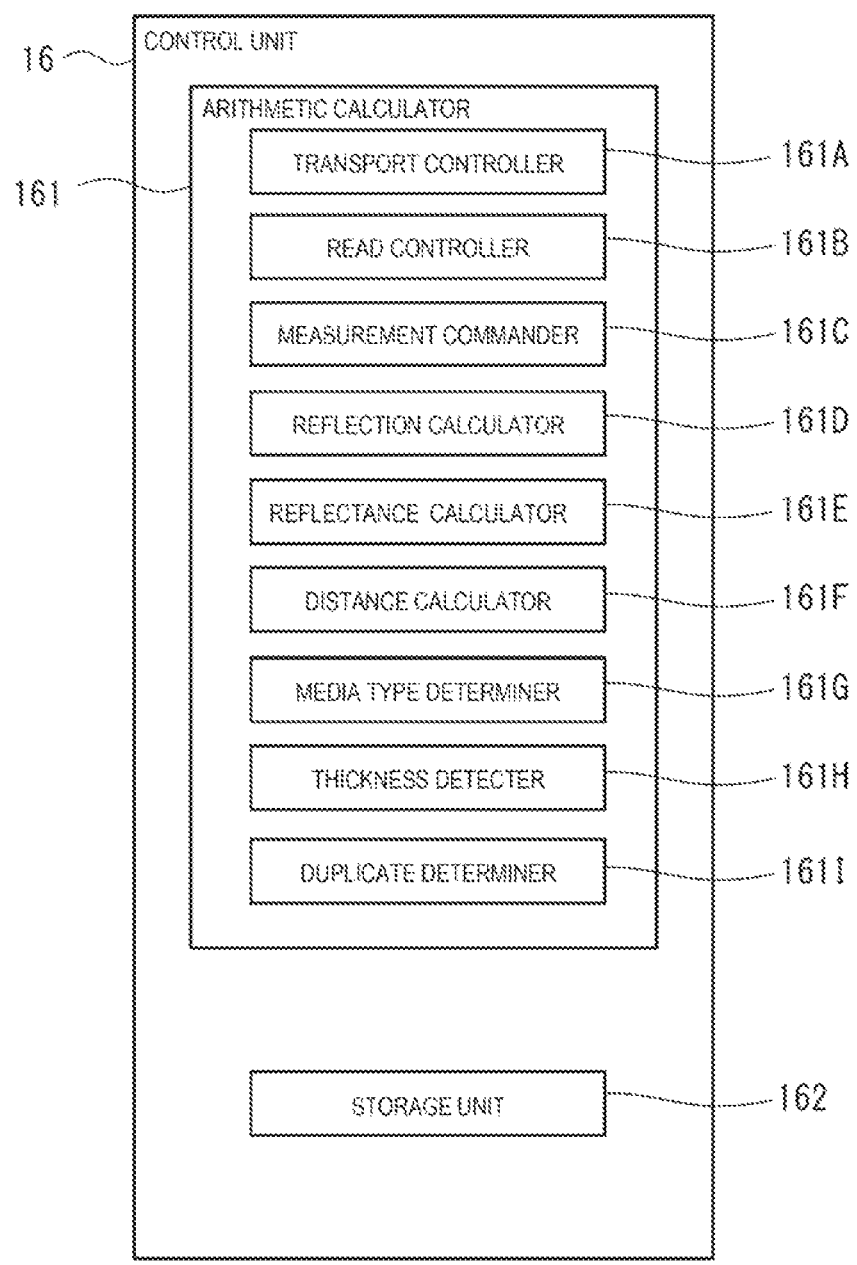
FIG. 9 is a block diagram illustrating a configuration of a control unit and a functional configuration of an arithmetic calculator in the first embodiment.

Next, the controller 16 will be described. FIG. 9 is a block diagram illustrating a schematic configuration of the controller 16 and a functional configuration of an arithmetic calculator 161. The controller 16 includes one or a plurality of processors. In the present embodiment, as illustrated in FIG. 9, the controller 16 includes the arithmetic calculator 161 configured with equal to or more than one central processing units (CPUs) and the like, and a storage unit 162 configured with a recording circuit such as a memory.

The controller 16 is coupled to a transport motor 135 of the transport portion 13, the scanning portion 14, the transport detection sensor 20 of the sensor portion 15, the spectrometer 30, the thickness measurement sensor 40, and the duplicate detection sensor 50, and controls the operation of the image scanner 10. In addition, the controller 16 receives various types of information and signals input from an external device such as a personal computer, and outputs the information read by the image scanner 10 to the external device.

The storage unit 162 records various data for controlling the image scanner 10 and various programs.

By reading and executing the various programs stored in the storage unit 162, as illustrated in FIG. 9, the arithmetic calculator 161 functions as a transport controller 161A, a read controller 161B, a measurement commander 161C, a reflectance calculator 161D, a reference calculator 161E, a distance calculator 161F, a media type determiner 161G, a thickness detector 161H, and a duplicate determiner 161I.

The transport controller 161A feeds the media P set in the media support 12 into the apparatus main body 11 one by one by controlling the transport motor 135 of the transport portion 13 and rotating a plurality of pairs of rollers 131 to 134. Furthermore, the transport controller 161A transports the fed media P along the transport path 130.

The read controller 161B controls the scanning portion 14 during the transport of the media P so as to read the image on the media P.

The measurement commander 161C outputs a measurement command to the spectrometer 30 and the thickness measurement sensor 40, causes the spectrometer 30 to perform a spectroscopic measurement of the media P, and causes the thickness measurement sensor 40 to perform an ultrasonic measurement of the media P.

Here, the spectroscopic measurement is processing for acquiring the spectrum intensity for each spectral wavelength by sequentially switching the wavelength of the light transmitted through the spectroscopic element 32 to a plurality of spectral wavelengths in the spectrometer 30, and receiving the light of each spectral wavelength by the light receiver element 33.

In addition, the ultrasonic measurement is processing for acquiring the ultrasonic wave information when the ultrasonic wave transmitter 41 of the thickness measurement sensor 40 transmits the ultrasonic wave and the ultrasonic wave receiver 42 receives the ultrasonic wave, that is, the first received sound pressure.

The reflectance calculator 161D calculates spectral reflectance from the spectrum intensity for each spectral wavelength obtained by the spectroscopic measurement. Here, both the spectrum intensity and the spectral reflectance are spectral information obtained by performing the spectroscopic measurement of the media P. In the present embodiment, the type of media P may be determined using the spectrum intensity obtained by the spectroscopic measurement, or the type of media P may be determined based on the spectral reflectance for each spectral wavelength calculated from the spectrum intensity. When obtaining the spectral reflectance, an emission spectrum of the light source portion 31 is measured in advance, and then, the spectral reflectance which is a ratio of the reflected light spectrum at the media P to the emission spectrum of illumination light from the light source portion 31, is calculated. By obtaining the spectral reflectance as described above, for example, even if the spectrum of the illumination light changes due to a time-related deterioration of light source portion 31, it is possible to stably perform type determination of the media P. The emission spectrum of the light source portion 31 can be measured by irradiating a white reference object of which the reflectance is known with the illumination light from the light source portion 31, and performing the spectroscopic measurement on the reflected light which is reflected from the white reference object.

The reference calculator 161E calculates the reference information used for the calculation by the distance calculator 161F based on a result of spectroscopic measurement and a result of ultrasonic measurement obtained by performing the spectroscopic measurement and the ultrasonic measurement on the reference target media P.

The distance calculator 161F calculates a Mahalanobis distance between the media P and each reference target based on the spectral information and the ultrasonic wave information obtained by performing the spectroscopic measurement and the ultrasonic measurement on the media P and the reference information stored in the storage unit 162.

The media type determiner 161G determines the type of media P based on the calculated Mahalanobis distance.

The thickness detector 161H detects a thickness of the media P based on the type of media P and the received sound pressure of the ultrasonic wave of each frequency measured by the thickness measurement sensor 40.

The duplicate determiner 161I sets a threshold value for detecting the duplication of the media P based on the type of media P and the thickness of the media P, and detects the duplication of media P by comparing the second received sound pressure acquired by duplicate detection sensor 50 with the set threshold value.

Operation of Image Sensor 10

In the image scanner 10 in the present embodiment, when performing the read processing for reading the image on the media P, the sensor portion 15 detects the duplication of media P in order to suppress the media P paper from being jammed in the transport path 130 or the image reading errors from occurring due to the duplication of media P.

Specifically, the duplicate determiner 161I determines whether or not the second received sound pressure is lower than a predetermined threshold value based on the second reception signal output from the duplicate detection sensor 50 provided in the sensor portion 15. That is, the duplicate determiner 161I determines that the media P is normally transported if the received sound pressure is equal to or higher than the threshold value, and determines that the media P is duplicated if the received sound pressure is lower than the threshold value.

However, when determining the duplication of the media P by receiving the ultrasonic wave output from the transmitter element 51 by the receiver element 52, in different types of media P, the composition substance and the composition ratio constituting the media P are different from each other, and thus, acoustic impedances of the media P are also different from each other. In addition, even if the media P has the same composition substance or the same composition ratio, the permeability of the ultrasonic wave becomes different if the thickness of media P is different. Therefore, in order to determine the duplication of the media P based on the second received sound pressure detected by the duplicate detection sensor 50, it is necessary to determine the type of media P and thickness appropriately and set the threshold value according to the type and the thickness.

Therefore, in the present embodiment, a feature amount of the measurement target media P is compared with feature amounts of predetermined reference targets (reference media), and the reference media having the feature amount closest to that of the media P is determined to be a type of the measurement target media P, and then, the thickness of the media P is measured. Here, in the present embodiment, in the comparison between the feature amount of the media P and the feature amount of the reference media, the Mahalanobis distance between the media P and the reference media is used.

Therefore, in the image scanner 10, first, reference information generation processing is performed, in which a preliminary measurement is performed on a plurality of types of reference media using the spectrometer and the thickness measurement sensor 40, and the reference information including various parameters to calculate the Mahalanobis distance is generated. This reference information generation processing may be performed at the time of factory shipment, may be performed at a constant cycle, or may be performed at a predetermined timing designated by a user. Hereinafter, the reference information generation processing performed at a timing designated by the user will be described.

Figure 10:
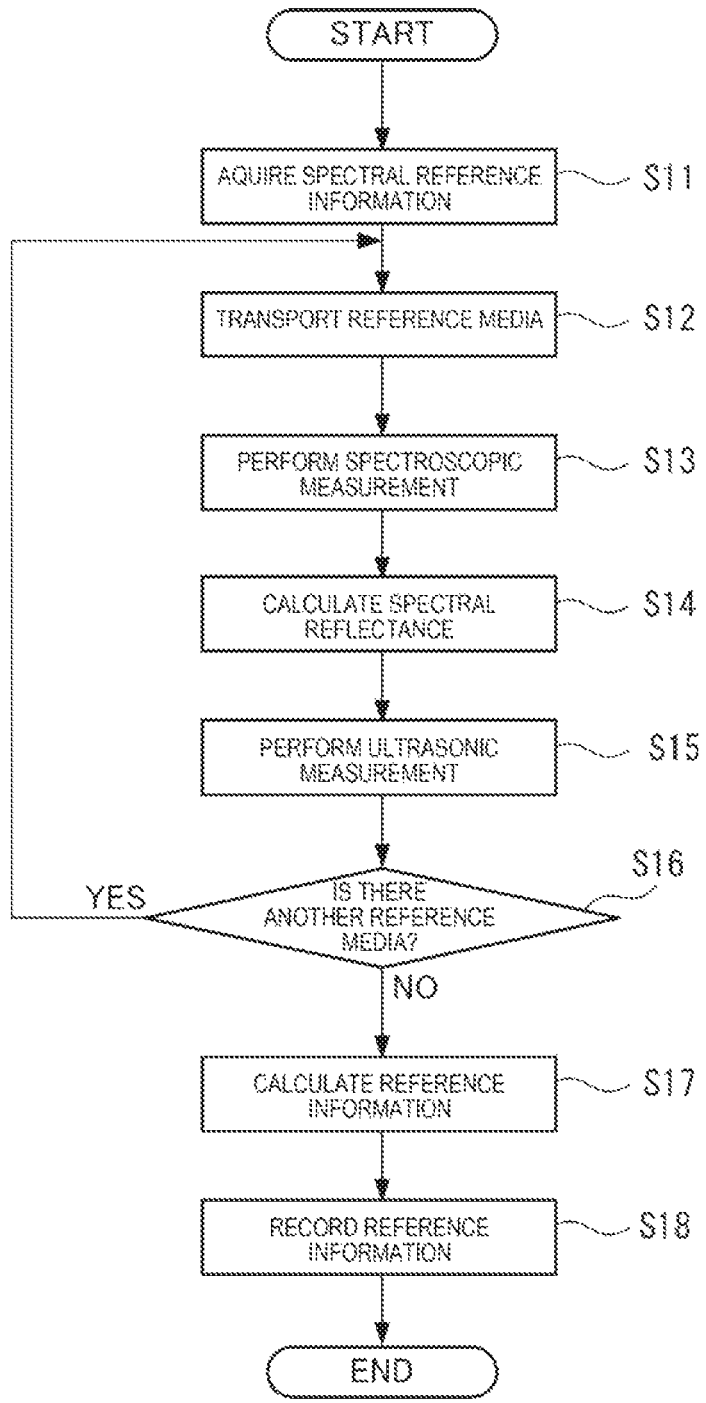
FIG. 10 is a flowchart illustrating reference information generation processing in a media type determination method in the first embodiment.

FIG. 10 is a flowchart illustrating the reference information generation processing in the media type determination method.

First, in the reference information generation processing, the controller 16 acquires spectral reference information using the spectrometer 30 (STEP S11). That is, in the present embodiment, after measuring the measurement target media P using the spectrometer 30, the reflectance calculator 161D converts the spectrum intensity for each spectral wavelength into the spectral reflectance. In STEP S11, the emission spectrum from the light source portion 31 that is necessary for the reflectance conversion is acquired as the spectral reference information.

Specifically, in STEP S11, spectroscopic measurement of the white reference object is performed using the spectrometer 30. The white reference object is a reference object of which the reflectance is known, and a reference object having the highest possible reflectance for a plurality of spectral wavelengths to be separated by the spectrometer 30 is used.

Next, the user sets the reference media as a reference target on the media support 12, and performs an input operation to command the start of measurement.

When receiving the start of measurement command, the transport controller 161A drives the transport motor 135 to transport the reference media along the transport path 130 (STEP S12).

Then, the transport controller 161A causes the light emission portion 21 in the transport detection sensor 20 to emit light, and detects a fact that the reference media has been transported to the sensor portion 15 at the timing when the amount of light received by the light receiving portion 22 becomes equal to or less than a predetermined value.

When the reference media is transported to the sensor portion 15, the measurement commander 161C outputs a spectroscopic measurement command that commands the spectrometer 30 to perform the spectroscopic measurement. Then, the spectrometer 30 performs the spectroscopic measurement on the reference media to acquire the spectrum intensity for a plurality of spectral wavelengths as the optical information, and outputs the result to the controller 16 (STEP S13).

In addition, the reflectance calculator 161D divides the spectrum intensity for each spectral wavelength obtained in STEP S13 by the spectral reference information measured in STEP S11, and calculates the spectral reflectance for each spectral wavelength (STEP S14).

Next, the measurement commander 161C outputs an ultrasonic measurement command that commands the thickness measurement sensor 40 to perform the ultrasonic measurement. Then, the thickness measurement sensor 40 performs the ultrasonic measurement on the reference media, outputs the ultrasonic wave from the ultrasonic wave transmitter 41 to acquire the first received sound pressure of the ultrasonic wave received by the ultrasonic wave receiver 42 as the ultrasonic wave information, and outputs the result to the controller 16 (STEP S15). At this time, the thickness measurement sensor 40 sequentially switches the frequencies of the ultrasonic wave output from the ultrasonic wave transmitter 41 to a plurality of frequencies $f_1$ to $f_M$, and acquires the first received sound pressures $d_1$ to $d_M$ for each frequency. Since the first received sound pressure is proportional to a signal voltage of the first reception signal, the values of $d_1$ to $d_M$ may be the signal voltage values of the first reception signal.

In the present embodiment, the measurement commander 161C performs the measurement processing from STEP S13 to STEP S15 for one type of reference media in multiple times. The measurement processing from STEP S13 to STEP S15 may be performed on plural locations of one reference media, or a plurality of same kind of reference media may be prepared, and then, the measurement processing from STEP S13 to STEP S15 for those plurality of same kinds of reference media may be performed.

Thereafter, the measurement commander 161C determines whether or not there is another reference media (STEP S16). For example, when the measurement processing from STEP S13 to STEP S15 is completed, the measurement commander 161C causes the transport controller 161A to discharge the reference media and to feed new reference media from the feeding port 11A. At this time, when the transport of the reference media is detected by the transport detection sensor 20, the measurement commander 161C determines YES in STEP S16. On the other hand, when the transport of the reference media is not detected, the measurement commander 161C determines NO in STEP S16 because the measurement for all the reference media is completed.

The determination in STEP S16 may be a performed based on an input operation by the user. For example, when the user performs an input operation to end the measurement of reference media, it may be determined NO in STEP S16.

If it is determined YES in STEP S16, the process returns to STEP S12, another reference media may be transported, and the measurement processing may be continued.

If it is determined NO in STEP S16, the reference calculator 161E calculates the reference information for calculating the Mahalanobis distance between the measurement target media P and the reference media (STEP S17).

Here, the calculation of reference information by the reference calculator 161E will be described.

By performing the spectroscopic measurement for the reference media of type i of STEP S13, L number of spectrum intensities corresponding to the spectral wavelengths of each spectral wavelengths $l_1$ to $l_L$ are measured. In STEP S14, the spectral reflectances $x_{i1}$ to $x_{iL}$ corresponding to respective spectral wavelengths are obtained. Furthermore, according to the ultrasonic measurement in STEP S15, the thickness measurement sensor 40 performs the ultrasonic measurement using a plurality of frequencies. When M number of frequencies from frequency $f_1$ to frequency $f_M$ are used, the first received sound pressure $d_{i1}$ to $d_{iM}$ corresponding to each frequency are obtained.

The reference calculator 161E uses the spectral reflectances $s_{i1}$ to $s_{iL}$ and the first received sound pressures $d_{i1}$ to $d_{iM}$ obtained by one measurement for each reference target as a learning values $x_{ij}$. That is, the learning value $x_{ij}$ is expressed as: $x_{ij} = (x_{i1}, x_{i2}, \ldots, X_{iL}, d_{i1}, d_{i2}, \ldots, D_{iM})^T$, and $x_{ij}$ includes L+M elements. Here, "T" indicates a transposed matrix.

Here, the thickness measurement sensor 40 measures each of the first received sound pressures corresponding to each frequency, but only the first received sound pressure $d_i$ for one frequency set in advance may be acquired. In this case, the learning value $x_{ij} = (x_{i1}, x_{i2}, \ldots, X_{iL}, d_i)^T$ including L+1 elements is obtained.

By performing the measurement processing from STEP S13 to STEP S15 in multiple times, a plurality of learning values $x_{ij}$ for type i can be obtained.

Next, as expressed in following Equation (1), the reference calculator 161E calculates an average learning value $x_{i\text{-}Av}$ obtained by calculating an average value for each element based on the learning value $x_{ij}$ for each type of reference media, and further, calculates an all-type average value $x_{\text{-}Av}$ obtained by averaging the values of the learning value $x_{ij}$ elements of all types of reference media.

$$x_{i-Av} = \frac{\sum_j X_{ij}}{N_i} \qquad (1)$$

$$x_{-Av} = \frac{\sum_{i,j} X_{ij}}{\sum_i N_i} \qquad (2)$$

Next, the reference calculator 161E obtains an intra-types covariance matrix $S_W$ and an inter-types covariance matrix $S_B$ as expressed in following Equations (3) and (4).

$$S_W = \sum_i \sum_j (x_{ij} - x_{i-Av})(x_{ij} - x_{i-Av})^T \qquad (3)$$

$$S_B = \sum_i N_i (x_{i-Av} - x_{-Av})(x_{i-Av} - x_{-Av})^T \qquad (4)$$

Next, the reference calculator 161E obtains matrices U and $\Lambda$ for $S_W^{-1} S_B$ using following Equation (5).

$$(S_W^{-1} S_B) U = \Lambda U \qquad (5)$$

$$U = \begin{pmatrix} u_{11} & u_{12} & \ldots & u_{1K} \\ u_{21} & u_{22} & \ldots & u_{2K} \\ \ldots & \ldots & \ldots & \ldots \\ u_{(L+M)1} & u_{(L+M)2} & \ldots & u_{(L+M)K} \end{pmatrix}$$

$$\Lambda = \begin{pmatrix} \lambda_1 & 0 & \ldots & 0 \\ 0 & \lambda_2 & \ldots & 0 \\ \ldots & \ldots & \ldots & \ldots \\ 0 & 0 & \ldots & \lambda_K \end{pmatrix}$$

In Equation (5), the matrix U is a matrix in which feature vectors u are arranged. The feature vectors u can be obtained as much as the number of elements (L+M) of the learning value $x_{ij}$, but the upper K numbers of them are used as the components of the matrix U. Therefore, the matrix U is a matrix of L+M rows and K columns. In addition, the matrix $\Lambda$ is a matrix of K rows and K columns in which the diagonal components are $(\lambda_1, \lambda_2, \ldots, \lambda_K)$ and other components are zero.

Next, the feature amount $y_{ij}$ for all the learning value $X_{ij}$ is obtained as expressed in following Equation (6). Furthermore, an average feature amount $y_{i\text{-}Av}$ that is an average value of the feature amounts $y_{ij}$ and a covariance matrix $\Sigma_i$ indicating the variation of the feature amount for each type are obtained for the reference media of type i using following Equations (7) and (8).

$$y_{ij} = U^T x_{ij} \qquad (6)$$

$$y_{i-Av} = \frac{\sum_j y_{ij}}{N_i} \qquad (7)$$

$$\sum_i = \frac{\sum_j (y_{ij} - y_{i-Av})(y_{ij} - y_{i-Av})^T}{N_i} \qquad (8)$$

The reference calculator 161E records the matrix U obtained as described above and the average feature amount $y_{ij}$ obtained for each type and the covariance matrix $\Sigma_i$ in the storage unit 162 as the reference information (STEP S18).

Read Processing

Next, image read processing by the image scanner 10 will be described.

Figure 11:
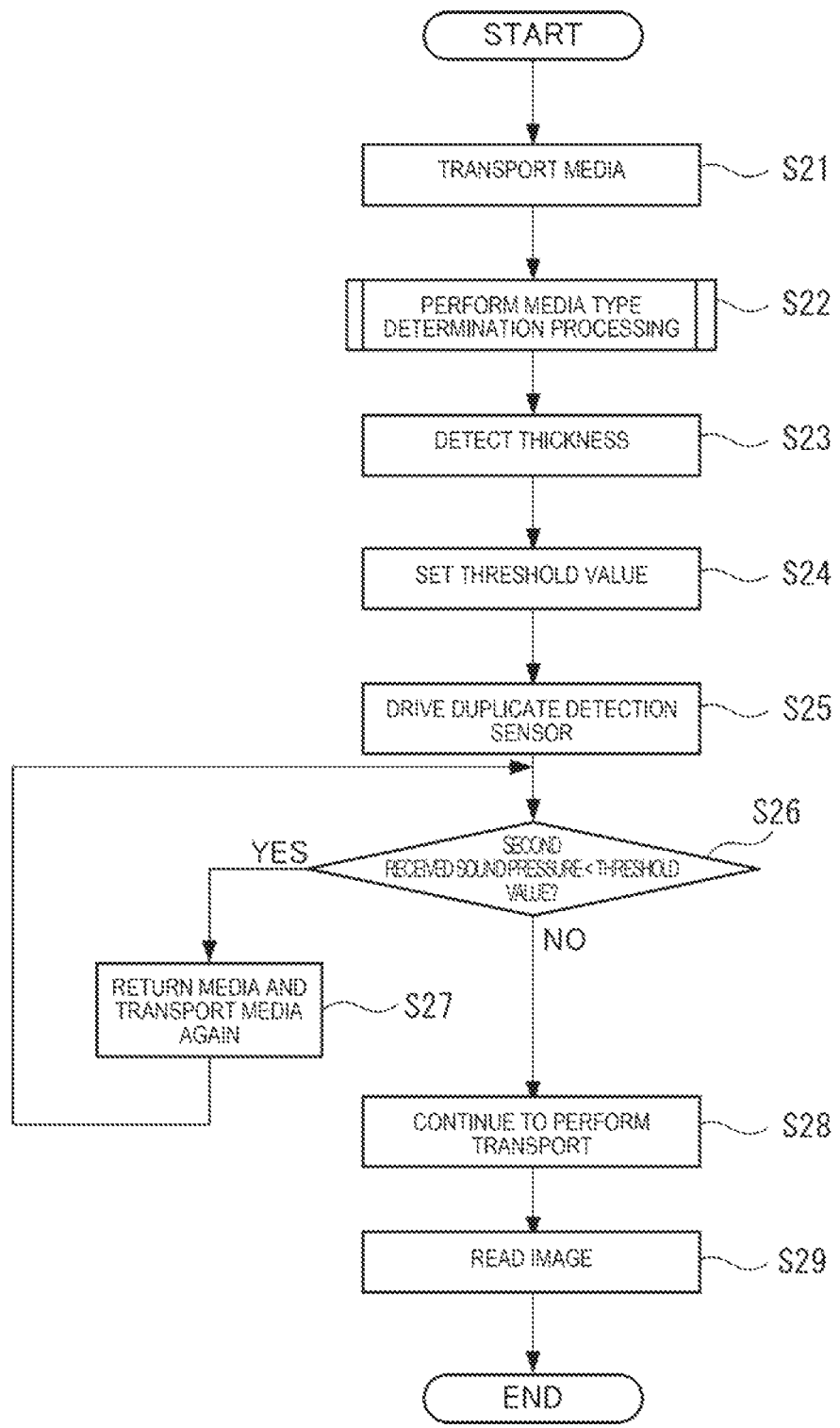
FIG. 11 is a flowchart illustrating read processing by the image scanner in the first embodiment.

FIG. 11 is a flowchart illustrating the read processing including the media type determination method by the image scanner.

When the user sets the media P on the media support 12 and performs an input operation to command to perform the read processing for reading the image with the image scanner 10, the transport controller 161A drives the transport motor 135 to transport the media P along the transport path 130 (STEP S21).

When it is detected by the transport detection sensor 20 that the media has been transported to the sensor portion 15, firstly, the media type determination processing is performed (STEP S22).

Figure 12:
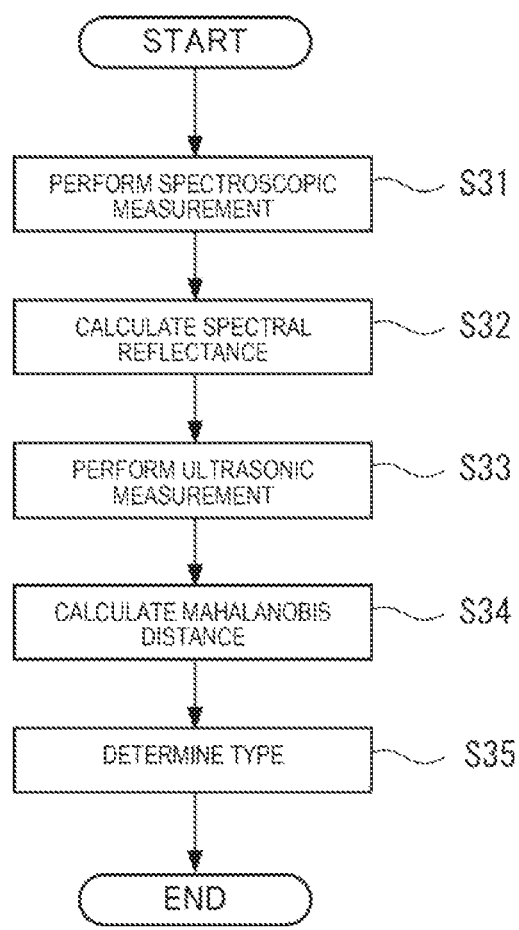
FIG. 12 is a flowchart illustrating media type determination processing in the first embodiment.

FIG. 12 is a flowchart illustrating the media type determination processing.

In the media type determination processing, firstly, the measurement commander 161C outputs a spectroscopic measurement command to command the spectrometer 30 to perform the spectroscopic measurement similarly to STEP S13. Then, the spectrometer 30 performs the spectroscopic measurement on the media P to acquire the spectrum intensity for each spectral wavelength $l_1$ to $l_L$ of the media P, and outputs the result to the controller 16 (STEP S31).

In addition, similarly to STEP S14, the reflectance calculator 161D divides each spectrum intensity obtained in STEP S31 by the spectral reference information obtained in STEP S11, and calculates the spectral reflectances $x_1$ to $x_L$ for each spectral wavelength (STEP S32).

In addition, the measurement commander 161C outputs an ultrasonic measurement command to command the thickness measurement sensor 40 to perform the ultrasonic measurement. Then, similarly to STEP S15, the thickness measurement sensor 40 performs the ultrasonic measurement to acquire the first received sound pressure as the ultrasonic wave information, and outputs the result to the controller 16 (STEP S33).

In STEP S33, the thickness measurement sensor 40 sequentially switches the frequencies of the ultrasonic wave output from the ultrasonic wave transmitter 41 to a plurality of frequencies $f_1$ to $f_M$, and acquires the first received sound pressures $d_1$ to $d_M$ for each frequency. As described above, the signal voltage of the first reception signal may be used for $d_1$ to $d_M$. In addition, when the first received sound pressure for any one frequency is used in reference information calculation processing, the first received sound pressure for that frequency may be used in STEP S33.

In this way, the measured value $x=(x_1, x_2, \ldots, x_L, d_1, d_2, \ldots, d_M)^T$ for the media P can be obtained.

Next, the distance calculator 161F reads the reference information from the storage unit 162, and calculates the Mahalanobis distances between a plurality of types of reference media and the media P (STEP S34).

Specifically, the feature amount y is calculated using the matrix U by following Equation (9), and the Mahalanobis distance $D_i$ for each reference target is obtained using the average feature amount $y_{i\text{-}Av}$ and the covariance matrix $\Sigma_i$ by following Equation (10).

$$y = U^T x \quad (9)$$

$$D_i = \sqrt{(y-y_{i\text{-}Av})^T \Sigma_i^{-1} (y-y_{i\text{-}Av})} \quad (10)$$

Thereafter, the media type determiner 161G determines the type i having the smallest Mahalanobis distance $D_i$ as the type of media P (STEP S35).

After STEP S22, the thickness detector 161H detects the thickness of the media P using the first reception signal output from the thickness measurement sensor 40 (STEP S23).

Hereinafter, the principle of the thickness detection by the thickness detector 161H will be described.

When the ultrasonic measurement is performed using the thickness measurement sensor 40, the value of the first received sound pressure varies depending on the type of media P, that is, the composition substance composing the media P. In addition, even if the same type of media P is composed of the same composition substance, the first received sound pressure has a different value if the media P has a different thickness.

Figure 13:
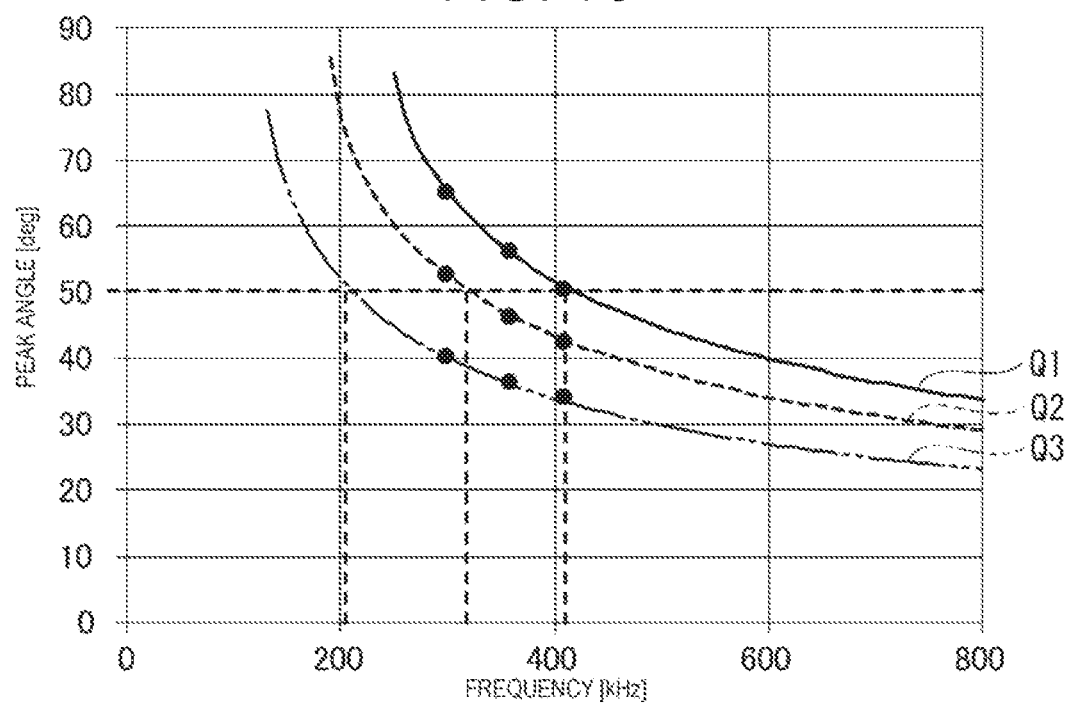
FIG. 13 is a diagram illustrating an angle that maximizes a received sound pressure when an ultrasonic measurement is performed while changing the angle of a first sensor central axis for plastic plates having the same composition substances and composition ratio but different thicknesses.

FIG. 13 is a diagram illustrating an angle that maximizes the first received sound pressure when the ultrasonic measurement is performed on the media P composed of plastic plates having the same composition substances and composition ratio but different thicknesses while changing the angle of the first sensor central axis 40C with respect to a normal line of the media P. The normal of media P is assumed to match the normal line of the transport path 130. In the description hereafter, in the angle of the first sensor central axis 40C with respect to the normal line of the media P, the angle that maximizes the first received sound pressure is referred to as the peak angle. In FIG. 13, a curve Q1 represents a result of measurement when the plastic plate with a thickness of 0.2 mm is used as the media P, a curve Q2 represents a result of measurement when a plastic plate with a thickness of 0.3 mm is used as the media P, and a curve Q3 represents a result of measurement when a plastic plate with a thickness of 0.5 mm is used as the media P.

When transmitting an ultrasonic wave to the media P and receiving an ultrasonic wave transmitted through the media P, a so-called coincidence effect occurs, in which the first received sound pressure (reception amplitude) when the ultrasonic wave is received varies depending on the frequency of the transmitted and received ultrasonic wave and the angle of the ultrasonic wave input to the media P.

Here, when focusing on one frequency of the ultrasonic wave transmitted from the ultrasonic wave transmitter 41, the peak angles that maximize the received sound pressure obtainable from the ultrasonic wave receiver 42 varies depending on the thickness of media P. For example, as illustrated in FIG. 13, when the ultrasonic wave having a frequency of approximately 400 kHz is used, the peak angle is about 50° for the 0.2 mm plastic plate, the peak angle is about 42° for the 0.3 mm plastic plate, and the peak angle is about 35° for the 0.5 mm plastic plate.

In addition, when the angle of inclination of the first sensor central axis 40C with respect to the normal of media P is fixed, the frequency of the ultrasonic wave that maximizes the first received sound pressure varies depending on the thickness of media P.

For example, in the example in FIG. 13, when the angle of inclination of the first sensor central axis 40C with respect to the normal line of the media P is fixed at 50°, in the media P of the plastic plate with a thickness of 0.2 mm, the first received sound pressure is maximized when an ultrasonic wave having a frequency of approximately 400 kHz is transmitted from the ultrasonic wave transmitter 41. In the media P of the plastic plate with a thickness of 0.3 mm, the first received sound pressure is maximized when the ultrasonic wave transmitter 41 transmits an ultrasonic wave having a frequency of approximately 300 kHz. In the media P of the plastic plate with a thickness of 0.5 mm, the first received sound pressure is maximized when the ultrasonic wave transmitter 41 transmits an ultrasonic wave having a frequency of approximately 200 kHz.

In the example, in FIG. 13, the type of media P is exemplified as a plastic plate, but the same applies to case where other types are used, and the same kind of media P with different thicknesses has different frequency of the ultrasonic wave from which the maximum received sound pressure can be obtained. That is, the value of the frequency from which the maximum received sound pressure can be obtained varies depending on the type of media P and the thickness.

Figure 14:
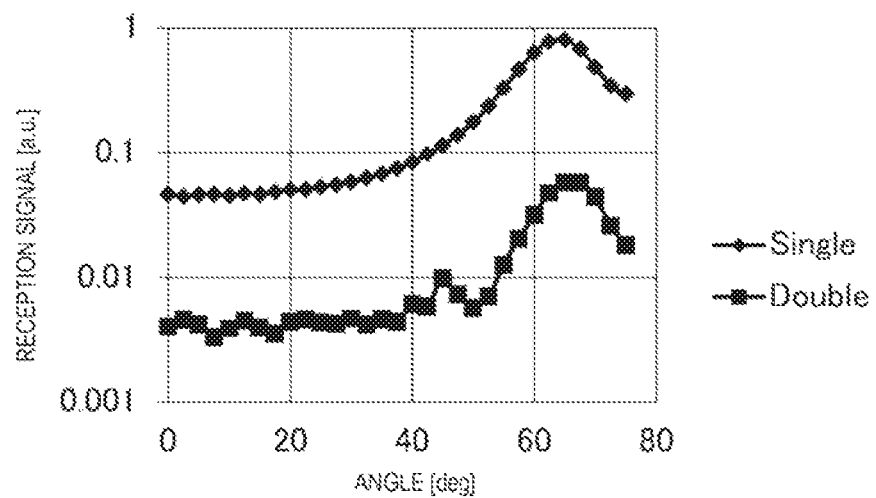
FIG. 14 is a diagram illustrating changes of the received sound pressures when an ultrasonic wave is transmitted to one plastic plate and two plastic plates while changing an angle of inclination of the first sensor central axis.
Figure 15:
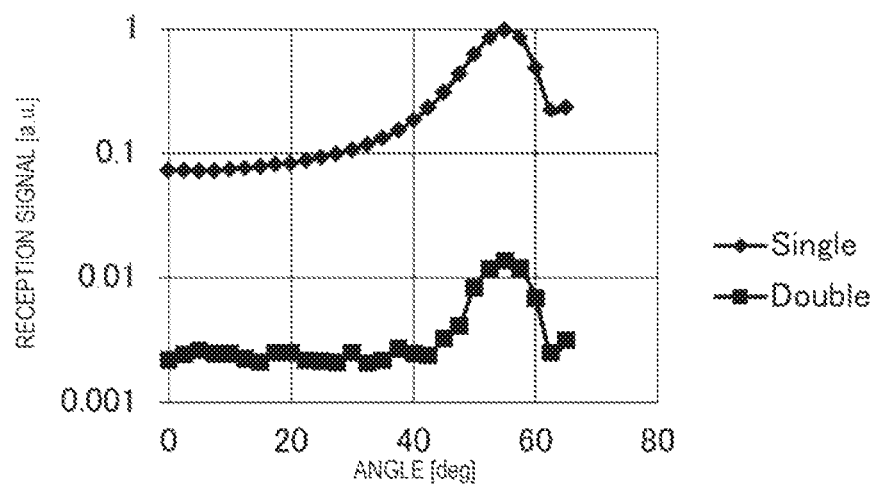
FIG. 15 is a diagram illustrating changes of the received sound pressures when an ultrasonic wave is transmitted while changing the angle of inclination of the first sensor central axis for one postcard and two postcards.

FIG. 14 is a diagram illustrating changes of the first received sound pressures when an ultrasonic wave having a predetermined frequency is transmitted to one plastic plate with a thickness of 0.2 mm and two plastic plates with a thickness of 0.2 mm while changing the angle of inclination of the first sensor central axis 40C with respect to the normal line of the media P. FIG. 15 is a diagram illustrating changes of the first received sound pressures when an ultrasonic wave having a predetermined frequency is transmitted to one postcard with a thickness of 0.23 mm and two postcards with a thickness of 0.23 mm while changing the angle of inclination of the first sensor central axis 40C with respect to the normal line of the media P.

As illustrated in FIG. 14 and FIG. 15, the peak angle does not vary between a case when the single media P is transported and a case when the media P is duplicated.

Accordingly, even when the media P is duplicated, if the type of media P is determined in the processing in STEP S22, the thickness of the media P can be measured from the first received sound pressure of each frequency measured by the thickness measurement sensor 40.

In the present embodiment, first relationship data is recorded in the storage unit 162 in advance, which indicates a relationship between the thickness of media P for each type of media P, the frequency at which the maximum received sound pressure is obtained, and the peak received sound pressure during the ultrasonic measurement using that frequency.

In STEP S23, the thickness detector 161H reads the first relationship data corresponding to the type of media P determined in STEP S22. In addition, the thickness detector 161H calculates a difference between the first received sound pressure of the ultrasonic wave of each frequency output from the thickness measurement sensor 40 and the peak received sound pressure corresponding to each frequency recorded in the first relationship data, and then, detects the thickness corresponding to the frequency in which the difference becomes minimum as the thickness of the media P. That is, the thickness detector 161H specifies the frequency that makes the angle of the first sensor central axis 40C with respect to the media P be the peak angle, and then, detects the thickness of the media P from the combination of the frequency and the peak angle.

Thereafter, the duplicate determiner 161I sets a threshold value for detecting the duplication of the media P based on the type of media P determined in STEP S22 and the thickness of the media P detected in STEP S23. (STEP S24).

For this purpose, second relationship data indicating the thickness of the media P and the threshold value for determining duplication for each type of media P is recorded in the storage unit 162 in advance. The duplicate determiner 161I reads the threshold value corresponding to the type of media P and the thickness from the second relationship data.

Thereafter, the duplicate determiner 161I drives the duplicate detection sensor 50 to perform duplicate detection processing (STEP S25). That is, the duplicate detection sensor 50 causes the transmitter element 51 to transmit an ultrasonic wave, and causes the receiver element 52 to receive the ultrasonic wave. The duplicate detection sensor 50 outputs the second reception signal which is based on the second received sound pressure output from the receiver element 52, to the controller 16.

When the second reception signal output from the duplicate detection sensor 50 is received, the duplicate determiner 161I determines whether or not the second received sound pressure is lower than the threshold value set in STEP S24 (STEP S26). The second received sound pressure is proportional to the signal voltage of the second reception signal. Therefore, the threshold value of the signal voltage of the second reception signal may be set in STEP S25, and the signal voltage of the second reception signal and the threshold value may be compared in STEP S26.

If it is determined as YES in STEP S26, that is, if the second received sound pressure is lower than the threshold value, it is determined that equal to or more than two media P are transported in duplicate because the sound pressure of the received ultrasonic wave transmitted through the media P is small. In this case, the transport controller 161A stops the transport operation of the media P, and reverses the transport direction of the media P to return the media P to the upstream of the transport direction as much as a predetermined amount such that the media P starts to be transported again (STEP S27). Thereafter, the duplicate determination in STEP S26 is performed again. If it is determined that there are multiple consecutive duplicates, an error message or the like may be displayed to terminate the processing.

If it is determined as NO in STEP S26, that is, if the second received sound pressure is equal to or higher than the threshold value, the transport controller 161A continues to perform the transport operation of the media P (STEP S28). When the transported media P reaches the reading position by the scanning portion 14, the read controller 161B controls the scanning portion 14 so as to read the image (STEP S29). Thereafter, the media P is further transported by the transport controller 161A, and then, the media P is discharged from the discharge port 11B.

Operation Effects in the Present Embodiment

The image scanner 10 in the present embodiment is configured to include the media type determination device that includes the sensor portion 15 and the controller 16, and detects the duplicate (multi-feed) of the media P based on the determined type of media P.

The sensor portion 15 includes the spectrometer 30 that detects the light from the media P and acquires the light information including the spectrum intensity, and the thickness measurement sensor 40 that performs the ultrasonic measurement in which the ultrasonic wave is transmitted to the media P and the ultrasonic wave via the media P is received to obtain the ultrasonic wave information including the received sound pressure. The media type determiner 161G of the controller 16 determines the type of media P based on the optical information and the ultrasonic wave information.

In other words, in the related art, since only the optical information was used when determining the type of media P, though the type based on the composition substance and the composition ratio of the media P can be determined, but a plurality of types of media P having the same composition substance and the same composition ratio with different thicknesses cannot be determined. In contrast, in the present embodiment, the media type determination based on the ultrasonic wave information via the media P is performed in addition to that based on the optical information. As for the ultrasonic wave, since the transmittance, the reflection, the attenuation factor, and the like change greatly depending on the thickness of the media P, it is possible to accurately perform the media type determination while taking the thickness of the media P into consideration by performing the media type determination using the ultrasonic wave information in addition to the optical information.

In the present embodiment, the spectrometer 30 is configured to include the light source portion 31, the spectroscopic element 32, and the light receiver element 33, and acquires the spectrum intensity for a plurality of spectral wavelengths included in the reflected light from the media P by performing the spectroscopic measurement on the media P, as the light information.

In this way, since the spectrometer 30 measures the spectrum intensity for a plurality of spectral wavelengths of the media P, it is possible to perform the measurement with higher accuracy than when acquiring the light having a single wavelength.

In the present embodiment, by performing the spectroscopic measurements and the ultrasonic measurements for a plurality of types of reference media in multiple times, the reference calculator 161E calculates the average feature amount $y_{i-Av}$ and the covariance matrix $\Sigma_i$ and the matrix U for each type. Then, the distance calculator 161F calculates the Mahalanobis distance between the measurement target media P and each reference media using the average feature amount $y_{i-Av}$, the covariance matrix $\Sigma_i$, and the matrix U, respectively, and the media type determiner 161G determines the type in which the Mahalanobis distance becomes minimum as the type of media P.

By performing the media type determination using such Mahalanobis distance as described above, the media type determination can be performed while taking the variations in spectral information during the spectroscopic measurement and the ultrasonic wave information during the ultrasonic measurement into consideration, and thus, it is possible to determine the type of media P with high accuracy. The variations described here include an in-plane variation due to the difference in the measurement position in the same media P, a variation for each reference media (lot difference) when a plurality of reference media of the same type are used, and a measurement variation in the sensors used for each measurement (the spectrometer 30 and the thickness measurement sensor 40), and in the present embodiment, it is possible to perform the media type determination while taking these variations into consideration.

In the present embodiment, the thickness measurement sensor 40 functions as the ultrasonic wave detector, and the thickness measurement sensor 40 includes the ultrasonic wave transmitter 41 that transmits the ultrasonic wave to the media P that was sent to the transport path 130, and the ultrasonic wave receiver 42 that receives the ultrasonic wave transmitted through the media P. The thickness measurement sensor 40 acquires the first received sound pressure, which is a sound pressure when the ultrasonic wave receiver 42 receives the ultrasonic wave, as the ultrasonic wave information.

The ultrasonic wave transmitted through the media P changes greatly depending on the thickness of the media P, for example, it is suitable as the information for determining the thickness of the media P compared to the sound pressure of the received ultrasonic wave which is reflected from the media P. Therefore, by setting the first received sound pressure detected by the thickness measurement sensor 40 as the ultrasonic wave information, the type of media P can be determined with high accuracy.

In the present embodiment, the thickness detector 161H detects the thickness of the media P based on the type of media P determined by the media type determiner 161G and the first received sound pressure measured by the thickness measurement sensor 40.

In the present embodiment, the thickness detector 161H detects the thickness of the media P using the coincidence effect of the determined type of media P. In this way, in addition to the type of media P, the thickness of the media P can be detected with high accuracy.

In the present embodiment, the first ultrasonic wave device 43 provided in the ultrasonic wave transmitter and the ultrasonic wave receiver 42 of the thickness measurement sensor 40 is configured to include the opening 431A having multiple types of opening widths so as to be able to transmit and receive the ultrasonic waves having multiple frequencies. The thickness detector 161H reads the peak received sound pressure corresponding to each frequency from the first relationship data corresponding to the determined type of media P, and then, detects the thickness of the media P by specifying the frequency in which the difference between the received sound pressure for each frequency obtained by the measurement and the peak received sound pressure for that frequency becomes minimum. In this way, it is possible to detect the thickness of the media P using the coincidence effect.

In the present embodiment, the sensor portion 15 includes the duplicate detection sensor 50, and the duplicate detection sensor 50 includes the transmitter element 51 that transmits the ultrasonic wave to the media P, and the receiver element 52 that receives the ultrasonic wave transmitted through the media P. In addition, the duplicate determiner 161I sets the threshold value based on the type of media P determined by the media type determiner 161G and the thickness of the media P detected by the thickness detector 161H. Then, the duplicate determiner 161I determines the duplicate of the media P by comparing the second received sound pressure of the ultrasonic wave received by the receiver element 52 with the threshold value.

The ultrasonic wave that transmitted through the media P changes depending on the type of media P and the thickness, however, in the present embodiment, it is possible to determine duplicate of the media P with high accuracy by setting the threshold value corresponding to the type and the thickness of the media P.

As a result, the image scanner 10 in the present embodiment can suppress a paper jam caused by duplicated feeding of the media P and an image reading error caused by reading the image fed in duplicate on the media P.

Second Embodiment

Next, a second embodiment will be described.

In the example in the first embodiment described above, the thickness measurement sensor 40 transmits an ultrasonic wave having a plurality of frequencies while the first sensor central axis 40C is fixed. On the other hand, the second embodiment is different from the first embodiment in a point that the first sensor central axis 40C of the thickness measurement sensor 40 can be changed. In the description hereinafter, the same reference numerals are given to the elements already described, and the description thereof is omitted or simplified.

Figure 16:
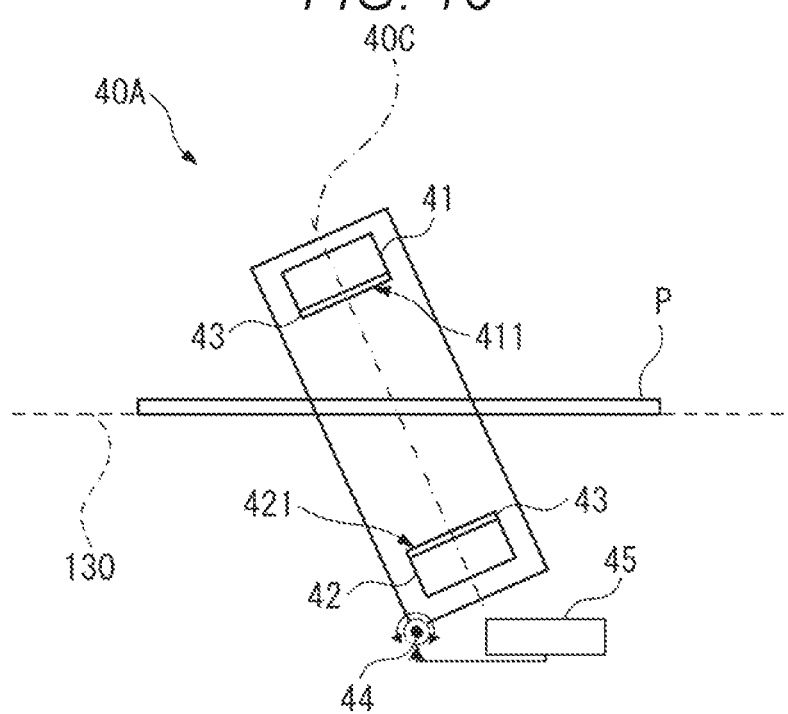
FIG. 16 is a diagram illustrating a schematic configuration of a thickness measurement sensor in a second embodiment.

FIG. 16 is a diagram illustrating a schematic configuration of a thickness measurement sensor 40A in the second embodiment.

As illustrated in FIG. 16, the thickness measurement sensor 40A in the present embodiment includes a rotation shaft 44 and a rotation mechanism 45 that rotates the thickness measurement sensor 40A around the rotation shaft 44.

Such a thickness measurement sensor 40A can change the angle of inclination with respect to the normal line of the media P of the first sensor central axis 40C using the rotation mechanism 45. In addition, the rotation mechanism 45 is provided with an angle measurement sensor such as a rotary encoder, and measures the angle of inclination of the first sensor central axis 40C.

In the thickness measurement sensor 40A in the present embodiment, the first ultrasonic wave device 43 transmits and receives the ultrasonic wave having a single frequency. Therefore, the opening width of each opening 431A of the first ultrasonic wave device 43 may be formed in the same width.

In the present embodiment like this, in the ultrasonic measurement in STEP S15 and STEP S33, an ultrasonic wave having a single frequency is transmitted while sequentially changing the angle of the first sensor central axis 40C, and the first received sound pressures $d_1$ to $d_M$ corresponding to each angle are acquired as the ultrasonic wave information.

Therefore, the reference calculator 161E calculates the reference information based on the spectral reflectance of the reference media and the first received sound pressure when the transmission and reception angles of the ultrasonic wave are changed. In addition, the distance calculator 161F calculates a Mahalanobis distance based on the spectral reflectance of the measurement target media P, the first received sound pressure when the transmission and reception angles of the ultrasonic wave are changed, and the reference information.

In addition, as illustrated in FIG. 14 and FIG. 15, when the ultrasonic wave having a predetermined frequency is transmitted while changing the angle of the first sensor central axis 40C, the first received sound pressure becomes peak at a specific angle corresponding to the type of media P and the thickness of the media P. Therefore, in STEP S23, the thickness detector 161H can detect the thickness of the media P by measuring the peak angle at which the first received sound pressure becomes peak. In this case, third relationship data indicating the relationship between the peak angle and the thickness of the media P is recorded in the storage unit 162.

When using the example illustrated in FIG. 13, when the media P is a plastic plate and the ultrasonic measurement is performed using the ultrasonic wave of 400 kHz, a thickness of 0.2 mm can be detected if the peak angle is approximately 50°, a thickness of 0.3 mm can be detected if the peak angle is approximately 42°, and a thickness of 0.5 mm can be detected if the peak angle is approximately 35°.

Operational Effects of the Present Embodiment

In the present embodiment, the thickness measurement sensor 40 transmits the ultrasonic wave from a plurality of angles to the media P transported to the transport path 130, and the thickness detector 161H detects the thickness of the media P based on the peak angle corresponding to the maximum received sound pressure among the received sound pressure of the ultrasonic wave corresponding to each angle. In this case, as long as only the relationship data in which the thickness of the media P and the peak angle are associated with each other on a one-to-one basis is used, it is possible to simplify the processing.

MODIFICATION EXAMPLE

Modification Example 1

In the first embodiment, in order to specify a frequency at which the angle of the first sensor central axis 40C with respect to the media P becomes the peak angle corresponding to the type of media P and the thickness, the difference between the received sound pressure at each frequency and the peak received sound pressure at each frequency recorded in the first relationship data was calculated.

In this case, when the media P is fed in duplicate, the received sound pressure decreases as a whole, and the thickness of the media P cannot be properly determined. Therefore, the difference between the received sound pressure and the peak received sound pressure is calculated for each frequency and when the minimum value of the difference is equal to or greater than a specific value set in advance, it may be determined that the media P is fed in duplicate.

In addition in this case, the duplicate detection sensor 50 may not be provided.

Modification Example 2

As described in the above embodiments, the reference calculator 161E and the distance calculator 161F calculate the reference information and the Mahalanobis distance based on the received sound pressure of the ultrasonic wave transmitted through the media P and the spectral information for the media P. In this case, the media type determination can be performed while taking the thickness of the media P based on the ease of transmission of the ultrasonic waves into consideration in addition to the determination of the type based on the composition substance included in media P and the difference in the composition ratio thereof.

Therefore, if the media P used in the image scanner 10 is only the limited media in advance, that is, if the usable type of media P and the thickness are limited, it is also possible to measure the thickness at the same time as the media type determination. In this case, an average feature amount $y_{i-Av}$ and a covariance matrix $\Sigma_i$ are calculated for each type and each thickness based on all the types and all thickness reference media that can be used by the image scanner 10. As a result, the thickness detection processing by the thickness detector 161H can be made unnecessary.

In this case, the thickness measurement sensor 40 may not be provided, and only the duplicate detection sensor 50 may be provided. That is, the reference information may be calculated or the Mahalanobis distance between the media P and the reference media may be calculated using the second received sound pressure obtained by the ultrasonic wave transmission and reception processing performed by the duplicate detection sensor 50.

Modification Example 3

In the embodiments described above, the media type determiner 161G determines the type of media P based on the Mahalanobis distance calculated by the distance calculator 161F, but not limited thereto. For example, the media type determiner 161G may calculate a Euclidean distance between the media P and the reference target and may determine the proximity between the media P, the reference media, and the feature amount.

Modification Example 4

In the example in the first embodiment, the reference information is calculated by the reference calculator 161E. However, the reference information may be stored in the storage unit 162 at the time of factory shipment, or may be received from another data server via the Internet or the like. In this case, the reference information calculation processing by the reference calculator 161E can be omitted.

Modification Example 5

In the embodiments described above, the ultrasonic wave is transmitted and received by vibrating the first vibrating plate 432 and the second vibrating plate 532 as the first ultrasonic wave device 43 and the second ultrasonic wave device 53. However, the present disclosure is not limited thereto. For example, a bulk-type piezoelectric element may be used, in which a voltage is applied to a piezoelectric body such that the ultrasonic wave is transmitted by vibrating the piezoelectric body itself or the ultrasonic wave is received.

Modification Example 6

In the example in the second embodiment, the thickness measurement sensor 40A is configured to be rotatable with the rotation shaft 44 as a center and is configured to be rotated at a predetermined angle by the rotation mechanism 45.

On the other hand, the thickness measurement sensor may include a plurality of ultrasonic wave transmitters 41 and a plurality of ultrasonic wave receivers corresponding to the ultrasonic wave transmitters 41, and the first sensor central axis 40C of each ultrasonic wave transmitter 41 may be inclined at a different angle with respect to each normal line of media P. In this case also, the first received sound pressure when the ultrasonic wave is output from a plurality of angles to the media P, can be acquired.

Furthermore, the ultrasonic wave transmitter 41 may be independently driven by a plurality of ultrasonic transducers arranged in one direction, or ultrasonic wave channels configured with a plurality of ultrasonic transducers are arranged in one direction and each ultrasonic wave channel may be independently driven. In this case, the transmission direction of the ultrasonic wave can be controlled in the direction corresponding to the delay time by delaying the driving of each ultrasonic transducer or each ultrasonic wave channel. As described above, by changing the transmission direction of the ultrasonic wave, the incident angle of the ultrasonic wave with respect to the normal line of the media P can be changed to a plurality of angles.

In this case, the ultrasonic wave receiver 42 may be configured to have an ultrasonic wave reception surface covering a range that can be scanned with the ultrasonic wave by the ultrasonic wave transmitter 41, for example. That is, the reception surface 421 of the ultrasonic wave receiver 42 is made sufficiently larger than the transmission surface 411 of the ultrasonic wave transmitter 41.

In the configuration described above, the rotation shaft 44 and the rotation mechanism 45 are not necessary and a plurality of ultrasonic wave transmitters 41 and a plurality of ultrasonic wave receivers 42 are not used, it is possible to simplify the configuration of the thickness measurement sensor 40A, and the thickness measurement sensor 40A can be reduced in size.

Modification Example 7

In the embodiments described above, the feature amount of the media P is calculated based on the spectral reflectance of the media P and the received sound pressure when the ultrasonic measurement is performed on the media P, but a spectrum intensity may be used instead of the spectral reflectance. Furthermore, the spectral reflectance and the spectrum intensity having a specific wavelength may be used without being limited to the spectral reflectance and the spectrum intensity having a plurality of spectral wavelengths of a predetermined wavelength interval. For example, the feature amount may be calculated using the component amounts of the principal component, the PLS component, and the independent component among the spectral reflectances of a plurality of spectral wavelengths.

Furthermore, an example in which the light detector is the spectrometer 30 and the spectrum intensity is obtained as the light information is illustrated, but for example, an image captured by an imaging camera including an RGB color filter may be used as the light information. In this case, the light information includes three color information of the light intensity of red wavelength band, the light intensity of green wavelength band, and the light intensity of blue wavelength band, and although the media type determination accuracy is lower than that in the embodiments described above, but the media type determination can be performed by an inexpensive apparatus. In addition, by performing the media type determination using the color information and the ultrasonic wave information, the media type determination accuracy can be improved compared to the case where the media type determination is performed using only the color information.

Modification Example 8

In the embodiments described above, the image scanner 10 is exemplified as an electronic apparatus that includes the media type determination device, but the present disclosure is not limited thereto.

For example, the media type determination device may be incorporated in a printer that transports a target object media to a predetermined printing position and performs print processing on the transported media using a print head. In this case, the printer is an electronic apparatus and the print head is a processing portion.

Specifically, the spectrometer 30 and the thickness measurement sensor 40 are mounted on the print head of the printer. The printer performs the media type determination of the media and the thickness detection using the method same as that in the above-described embodiment before performing the print processing using the print head. In this way, the printer performs the print processing according to the determined media type and the thickness. For example, color conversion processing for reproducing the color of the image data on the media, halftone processing, calculation of the ink discharge amount, and the like are performed.

Furthermore, the sensor portion 15 similar to that in the embodiments described above may be provided in the printer to detect the duplicated feeding of the transported media.

What is claimed is:
1. A media type determination device comprising:
   a light detector that detects light from a target object;
   a sensor that transmits an ultrasonic wave to the target object and performs an ultrasonic measurement for receiving the ultrasonic wave transmitted through the target object; and
   one or a plurality of processors, wherein
   the one or plurality of processors are programmed to execute a method including:
   acquiring light information corresponding to the light from the target object, from the light detector;
   acquiring ultrasonic wave information corresponding to an ultrasonic wave via the target object from the sensor; and
   determining a type of target object based on the light information and the ultrasonic wave information.
2. The media type determination device according to claim 1, wherein
   the light detector performs a spectroscopic measurement on the target object, and
   the one or plurality of processors are programmed to execute the method including:

acquiring spectral information corresponding to a plurality of spectral wavelengths included in the light from the target object, from a spectrometer as the light information.

3. The media type determination device according to claim 2, wherein the one or plurality of processors are programmed to execute the method including:

calculating an average of feature amounts indicating features of reference targets and a covariance matrix of the feature amounts for each of a plurality of types of the reference targets based on the spectral information and the ultrasonic wave information obtained by performing the spectroscopic measurement multiple times for the reference targets by the light detector and performing the ultrasonic measurement by the sensor; and calculating a Mahalanobis distance between the target object and the reference target by using the calculated average and covariance matrix, and the one or plurality of processors are further programmed to execute the method including:

determining the type of the target object based on the Mahalanobis distance for the plurality of types of the reference targets.

4. The media type determination device according to claim 1, wherein the sensor includes an ultrasonic wave transmission device that transmits an ultrasonic wave to the target object, and an ultrasonic wave reception device that is arranged on a side opposite to the ultrasonic wave transmission device with respect to the target object and receives the ultrasonic wave transmitted through the target object, and the one or plurality of the processors are programmed to acquire a received sound pressure of the ultrasonic wave when the ultrasonic wave transmitted through the target object is received by the ultrasonic wave reception device as the ultrasonic wave information.

5. The media type determination device according to claim 4, wherein the one or plurality of processors are programmed to execute the method including:

measuring a thickness of the target object based on the determined type of the target object and the received sound pressure.

6. The media type determination device according to claim 5, wherein the sensor performs the ultrasonic measurement with the ultrasonic wave of a plurality of frequencies, and the one or plurality of processors are programmed to execute the method including:

measuring the thickness of the target object based on the received sound pressure of each ultrasonic wave of each frequency.

7. The media type determination device according to claim 5, wherein the ultrasonic wave transmission device transmits an ultrasonic wave to the target object from a plurality of angles, and the one or plurality of processors are programmed to execute the method including:

measuring the thickness of the target object based on the angle corresponding to a maximum received sound pressure among the received sound pressures of the ultrasonic waves corresponding to the respective angles.

8. The media type determination device according to claim 5, further comprising:

a transmitter element that transmits an ultrasonic wave to the target object, a receiver element that is arranged on a side opposite to the transmitter element with respect to the target object and receives the ultrasonic wave transmitted through the target object, and a duplicate detection sensor that measures a second received sound pressure which is the received sound pressure when the ultrasonic wave transmitted through the target object is received by the receiver element, and wherein the one or plurality of processors are programmed to execute the method including:

determining a duplicate of the target objects by comparing the second received sound pressure and a predetermined threshold value, and setting the threshold value according to the determined type and the measured thickness of the target object.

9. An electronic apparatus comprising:

the media type determination device according to claim 1, and a processing portion that performs predetermined processing based on the type of the target object determined by the one or plurality of processors.

10. A media type determination method for determining a type of a target object, the method comprising:

detecting light from the target objects using a light detector;

transmitting an ultrasonic wave to the target object and perform an ultrasonic measurement to receive the ultrasonic wave transmitted through the target objects using a sensor;

acquiring light information corresponding to the light from the target object, from the light detector;

acquiring ultrasonic wave information corresponding to the ultrasonic wave transmitted through the target object, from the sensor; and determining a type of the target object based on the light information and the ultrasonic wave information.

* * * * *